(12) United States Patent
Matsuoka

(10) Patent No.: US 7,173,523 B2
(45) Date of Patent: Feb. 6, 2007

(54) VEHICULAR REAR AND SIDE WARNING DEVICE

(75) Inventor: Katsuji Matsuoka, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 141 days.

(21) Appl. No.: 11/077,013

(22) Filed: Mar. 11, 2005

(65) Prior Publication Data
US 2006/0077052 A1  Apr. 13, 2006

(30) Foreign Application Priority Data
Sep. 24, 2004  (JP)  ............ P2004-277474

(51) Int. Cl.
*B60Q 1/52* (2006.01)
(52) U.S. Cl. ............... 340/471; 340/468
(58) Field of Classification Search ........... 340/471, 340/468, 472, 473; 116/28 R
See application file for complete search history.

(56) References Cited

U.S. PATENT DOCUMENTS

| | | | | |
|---|---|---|---|---|
| 4,682,146 A | * | 7/1987 | Friedman, III | 340/468 |
| 5,434,554 A | * | 7/1995 | Caesar | 340/468 |
| 6,744,359 B1 | * | 6/2004 | Wasilewski et al. | 340/467 |
| 6,850,156 B2 | * | 2/2005 | Bloomfield et al. | 340/467 |
| 6,947,576 B2 | * | 9/2005 | Stam et al. | 340/468 |

FOREIGN PATENT DOCUMENTS

| | | |
|---|---|---|
| JP | 54118036 A | 9/1979 |
| JP | 8293099 A | 11/1996 |
| JP | 2002-233699 A | 8/2000 |
| JP | 2002-274303 A | 9/2002 |

* cited by examiner

Primary Examiner—John Tweel, Jr.
(74) Attorney, Agent, or Firm—Sughrue Mion, PLLC

(57) ABSTRACT

There is provided a vehicular rear and side warning device which does not issue a warning against a roadside stationary body such as a guard rail or a wall, and certainly issues a warning against a vehicle approaching from behind or a vehicle existing in a blind spot region of an own vehicle. A warning object judgment unit includes a noted sampling timing setting unit for setting a noted sampling timing on the basis of a peak timing obtained by a peak detection unit, and a frequency judgment unit for judging whether a frequency component not lower than a frequency threshold set by a frequency threshold setting unit exists with respect to an FFT operation result at the noted sampling timing. In a case where a front approaching body recognition unit judges that a material body approaches from in front of the own vehicle, and when the frequency judgment unit judges that a frequency component not lower than the frequency threshold exists, it is judged that the material body is a stationary body and is not a warning object.

9 Claims, 26 Drawing Sheets

EXPLANATORY NOTES
○ : DISTANCE AT TIME WHEN MATERIAL BODY IS DETECTED FOR THE FIRST TIME
● : DISTANCE AT TIME WHEN SIGHT OF MATERIAL BODY IS LOST

EXPLANATORY NOTES
○ : DISTANCE AT TIME WHEN MATERIAL BODY IS DETECTED FOR THE FIRST TIME
● : DISTANCE AT TIME WHEN SIGHT OF MATERIAL BODY IS LOST

VEHICULAR REAR AND SIDE WARNING DEVICE

BACKGROUND OF THE INVENTION

1. Field of the Invention

The present invention relates to a vehicular rear and side warning device for detecting a material body existing in the side and oblique rear portion (dead angle or blind spot for a driver) of an own vehicle during traveling and for issuing a warning.

2. Description of the Related Art

Conventionally, there is known a warning device in which in order to prevent an accident during vehicle traveling, a distance measuring sensor or the like is mounted in a vehicle, an obstacle around the vehicle is detected, and a warning is given to a driver.

For example, as a conventional warning device, there is known a reckless overtaking warning device disclosed in JP-A-54-118036. This device monitors an oblique rear portion in a direction in which a vehicle changes lanes, and detects a following vehicle in that direction. In this device, an instruction operation of the lane change is detected, and when this instruction operation occurs, it is judged whether or not the following vehicle is in a specified region, and a warning of dangerous overtaking is issued according to this judgment result.

Besides, a warning device disclosed in JP-A-2000-233699 carries out such a control that a vehicle traveling state is recognized on the basis of information of a steering angle, a yaw rate sensor, navigation and the like, and a material body in a direction suitable for the traveling state is detected, so that a warning is issued when an obstacle is detected around the vehicle.

[Patent document 1] JP-A-54-118036
[Patent document 2] JP-A-2000-233699

However, in the conventional warning device as stated above, since the warning is issued against all material bodies existing in a specified distance range, the warning is issued also against, for example, a guard rail or a wall at the exit of a freeway or the like, and there has been a problem that the driver feels annoyance.

SUMMARY OF THE INVENTION

The present invention has been made to solve the problem as stated above, and provides a vehicular rear and side warning device which does not issue a warning against a roadside stationary body such as a guard rail or a wall, and certainly issues a warning against a vehicle approaching from behind or a vehicle existing in a blind spot region of an own vehicle.

A vehicular rear and side warning device of the invention includes a transmission unit for transmitting a pulse-like electric wave to an oblique rear portion at a lane change side of an own vehicle, a reception unit for receiving a reflected wave of the electric wave transmitted from the transmission unit and reflected by plural material bodies and for outputting a beat signal, a sampling unit for sampling the beat signal at specified time intervals from a time of transmission start, an FFT operation unit for performing an FFT operation on sampling time series data at each of sampling timings obtained by the sampling unit, a maximum amplitude component extraction unit for obtaining a maximum amplitude value and its frequency component on an FFT operation result at each of the sampling timings, a detection threshold setting unit for setting a detection threshold on the basis of the maximum amplitude value at each of the sampling timings obtained by the maximum amplitude component extraction unit, a peak detection unit for detecting a peak exceeding the detection threshold on the basis of the maximum amplitude value at each of the sampling timings obtained by the maximum amplitude component extraction unit, a distance/relative speed operation unit for calculating a distance from a peak timing obtained by the peak detection unit and for calculating a relative speed from a frequency component at the peak timing, a lane change intention detection unit for detecting a lane change intention of a driver, a warning object judgment unit for judging whether a material body detected by the peak detection unit is a warning object for the driver, and a warning judgment unit for issuing a warning to the driver when at least it is detected that a material body exists within a specified distance in a side and oblique rear portion of the own vehicle, the lane change intention of the driver is detected by the lane change intention detection unit, and the warning object judgment unit judges that the material body is the warning object for the driver, wherein the warning object judgment unit includes a front approaching body recognition unit for recognizing, from a temporal history of distance, a material body approaching from in front of the own vehicle, a frequency threshold setting unit for setting a threshold on a Doppler frequency according to a speed of the own vehicle, a noted sampling timing setting unit for setting a noted sampling timing on the basis of the peak timing obtained by the peak detection unit, and a frequency judgment unit for judging, with respect to an FFT operation result at the noted sampling timing, whether there is a frequency component not lower than the frequency threshold set by the frequency threshold setting unit, and wherein in a case where the front approaching body recognition unit judges that the material body approaches from in front of the own vehicle, and when the frequency judgment unit judges that the frequency component not lower than the frequency threshold exists, the material body is judged to be a stationary body and not to be a warning object.

According to the vehicular rear and side warning device of the invention, a roadside stationary body such as a guard rail or a wall is distinguished from a vehicle approaching from behind or a vehicle existing in a blind spot region, and a warning can be issued only against the latter case, and therefore, there is obtained an effect that a warning unnecessary for a driver is removed, and only a necessary warning is generated.

DETAILED DESCRIPTION OF THE INVENTION

Embodiment 1

Embodiment 1 of the present invention will be described.

Figure 1:
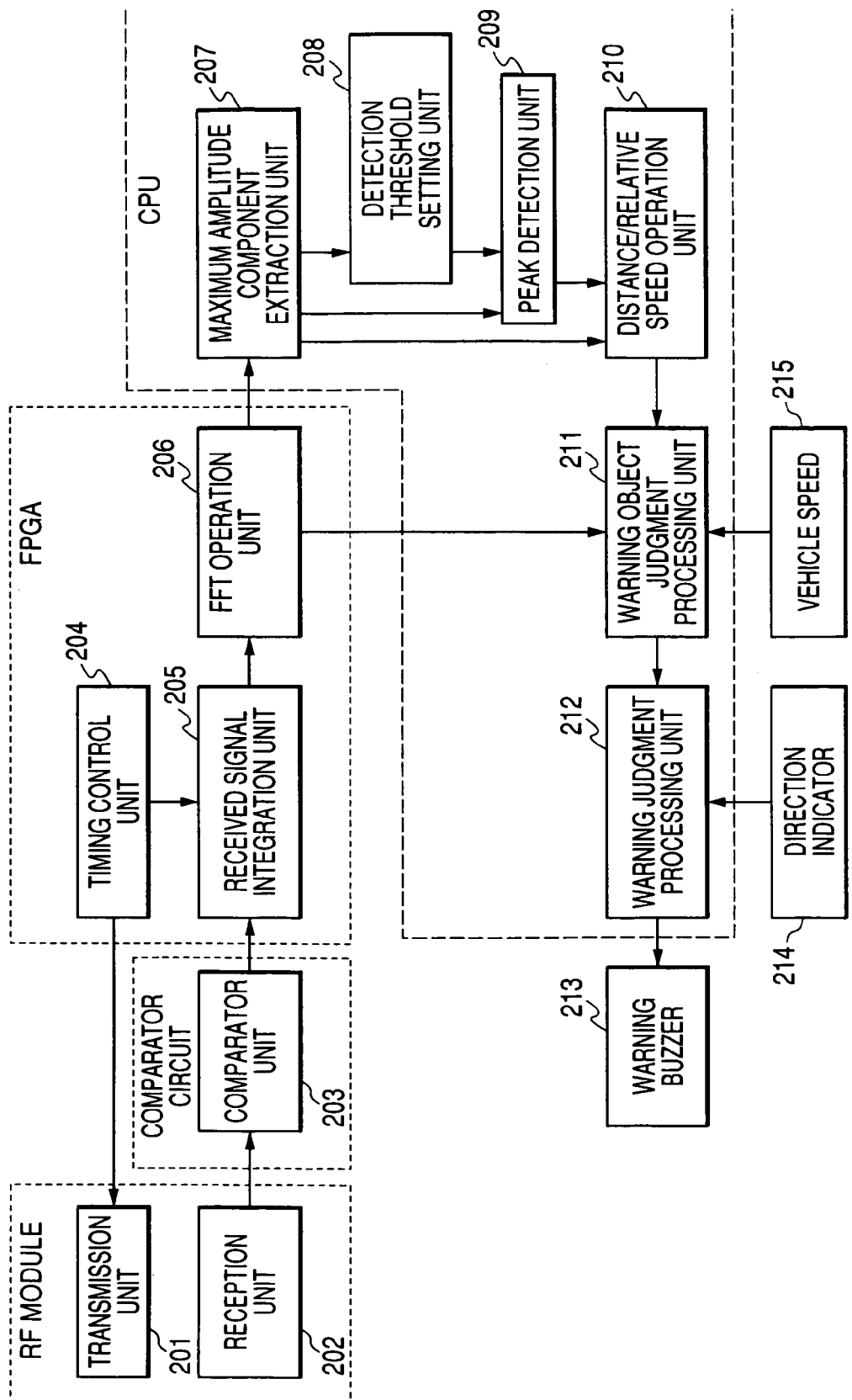
FIG. 1 is a view showing a block structure of embodiment 1 of the invention.

FIG. 1 shows a structure of a vehicular rear and side warning device of the embodiment 1. Respective blocks of FIG. 1 are as follows:

201: a transmission unit for transmitting a pulse-like electromagnetic wave having a specified width;

202: a reception unit for receiving a reflected wave of the electromagnetic wave by a peripheral object;

203: a comparator unit for binarizing a received wave;

204: a timing control unit for generating a transmission pulse and a reception timing signal;

205: a received signal integration unit for integrating a binarized received signal at every sampling timing;

206: an FFT operation unit for performing an FFT (Fast Fourier Transform) operation on an integrated received signal at every sampling timing;

207: a maximum amplitude component extraction unit for obtaining a maximum amplitude value and its frequency component from FFT operation results at every sampling timing;

208: a detection threshold setting unit for setting a detection threshold on the basis of the maximum amplitude value of the FFT operation results at every sampling timing;

209: a peak detection unit for detecting a peak exceeding the detection threshold on the basis of the maximum amplitude value of the FFT operation results at every sampling timing;

210: a distance/relative speed operation unit for calculating a distance and a relative speed;

211: a warning object judgment unit for judging whether or not the object is a warning object for a driver;

212: a warning judgment unit for judging whether or not a warning buzzer 213 should be driven on the basis of an ON/OFF state of a direction indicator 214 and a judgment result of the warning object judgment unit; and

215: input vehicle speed.

Here, although an example will be described in which a received signal is binarized and is integrated, the received signal may be A/D converted.

Figure 2:
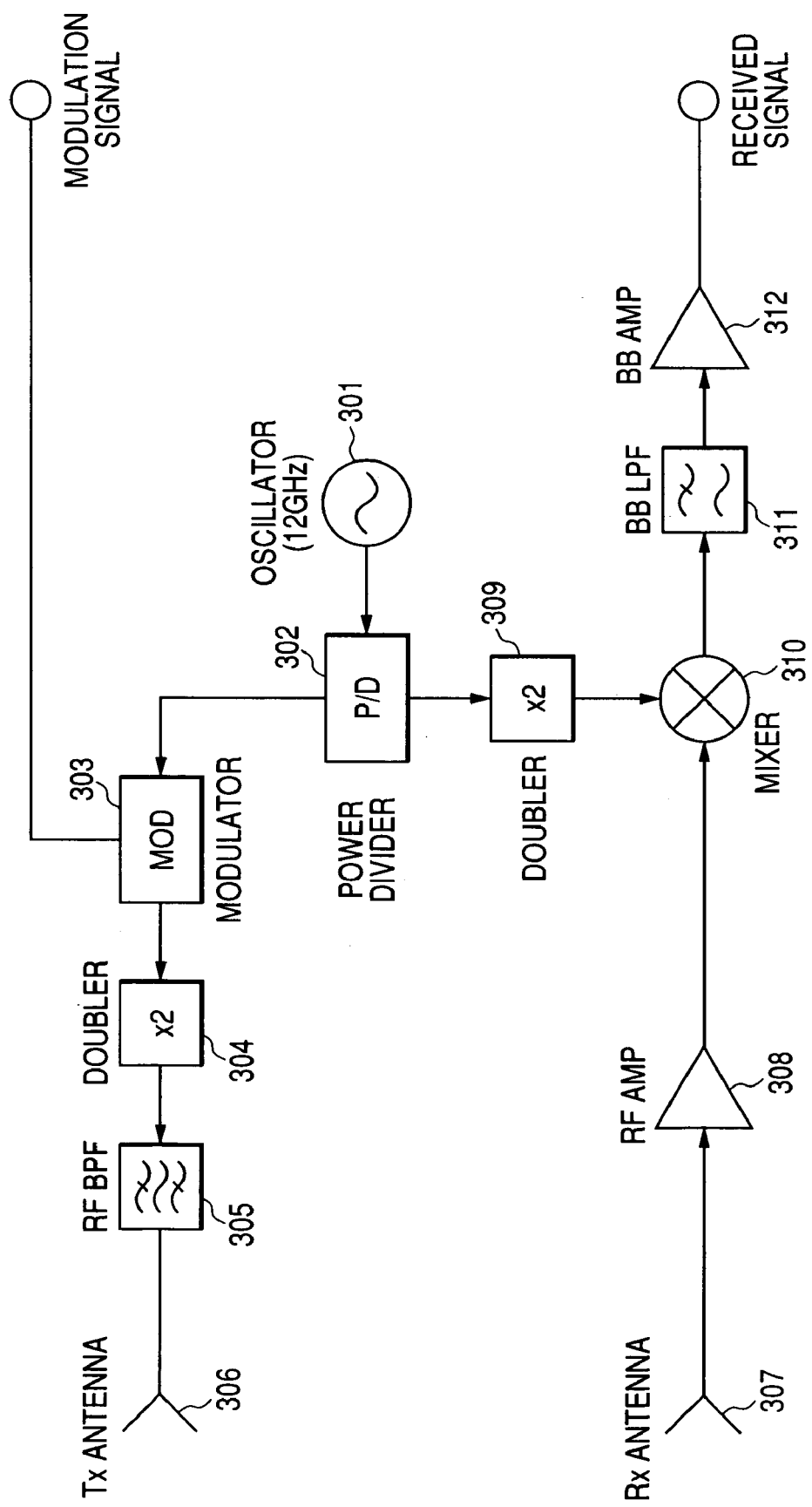
FIG. 2 is a view showing a structure of an RF module of the embodiment 1.

FIG. 2 shows a structure of an RF module including the transmission unit 201 and the reception unit 202.

An electric wave of 12 GHZ generated by an oscillator 301 is divided by a power divider 302, and is pulse (ASK) modulated by a modulator 303. Thereafter, the wave is multiplied to 24 GHz by a doubler 304, the electric wave of 12 GHZ is suppressed by a band pass filter 305, and the electric wave of 24 GHz is radiated through a transmission antenna 306.

The reflected wave from a material body is received through an antenna 307, is amplified by an RF amplifier 308, and is then inputted to a mixer 310. On the other hand, the electric wave of 12 GHz divided by the power divider 302 is multiplied to 24 GHz by a doubler 309, and is inputted to the mixer 310. In the mixer 310, the two input electric waves are mixed, and a baseband signal is outputted. Thereafter, a high frequency component is cut by a low pass filter 311, and after being amplified by a baseband amplifier 312, the signal is outputted as a received signal.

Figure 3A:
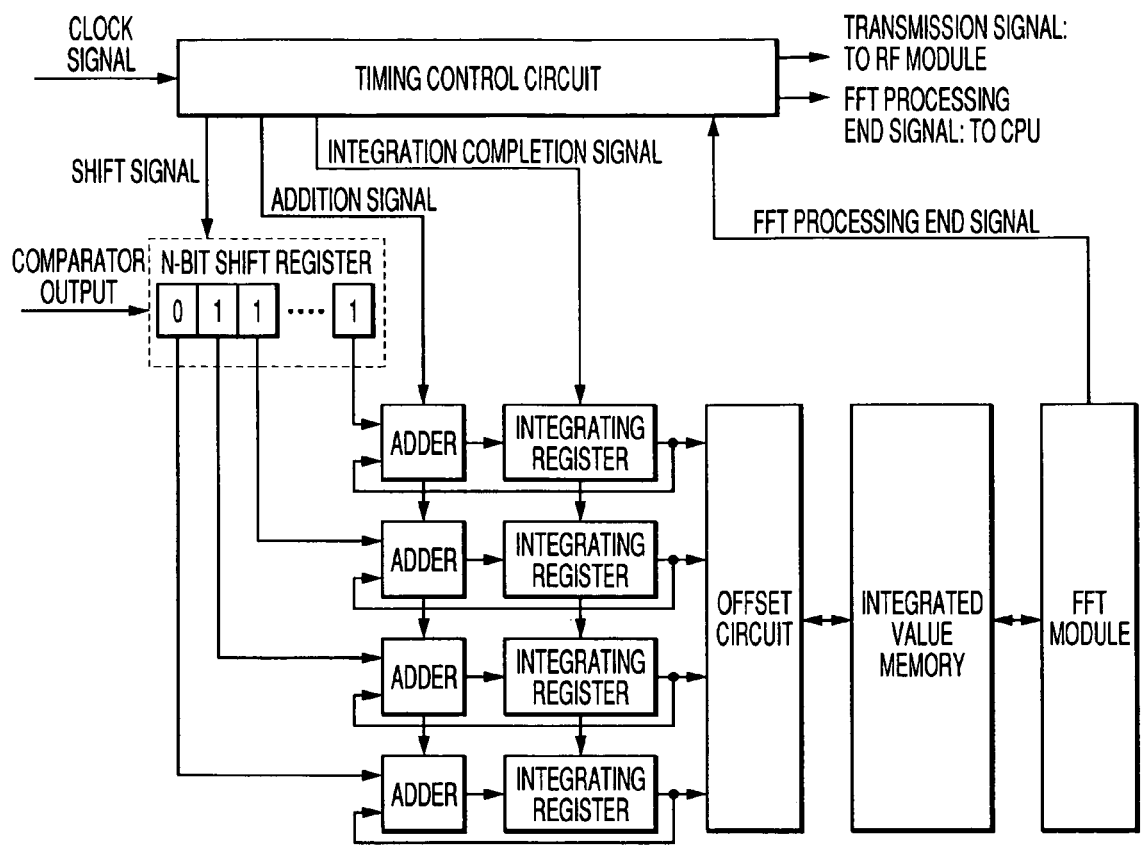
FIGS. 3A and 3B are views for explaining a structure in an FPGA of the embodiment 1 and its operation.
Figure 3B:
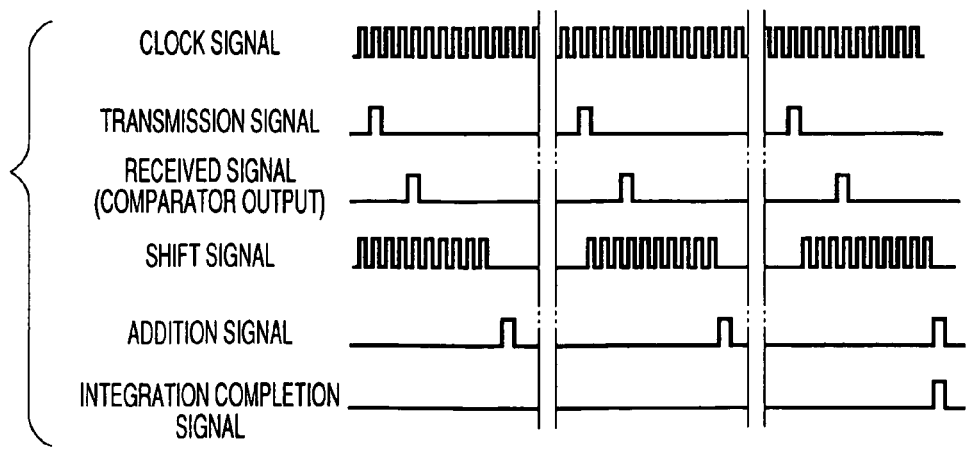

Next, FIG. 3A shows an inner unit structure of an FPGA constructed of the timing control unit 204, the received signal integration unit 205, and the FFT operation unit 206, and FIG. 3B shows a timing chart.

As shown in FIG. 3A, the FPGA is constituted by a timing control circuit, a shift register, adders corresponding to the respective bits of the shift register, integrating registers, an offset circuit, an integrated value memory for storing an integrated value by a specified number of times of integration operations, and an FFT module for performing an FFT operation.

On the basis of a clock signal (for example, 125 MHz=8 ns in period) by an oscillator connected to an outer unit of the FPGA, the timing control circuit generates a transmission signal to allow the transmission unit to turn On/Off electromagnetic radiation, a shift signal to transmit a timing of bit shift to the after-mentioned shift register, an addition signal to transmit an addition timing to the adder, and an integration completion signal to indicate to the integrating register that a specified number of times (for example, 100) of integrations are completed. The integration completion signal has a function to transmit a value of the integrating register to the integrated value memory and to clear the value of the integrating register. The shift register stores binary data outputted from a comparator circuit while shifting bit by bit on the basis of the shift signal of the timing control circuit (bit number=N). The adder adds the binary data (0 or 1) of each bit and the content of the integrating register in accordance with the addition signal from the timing control circuit. The integrating register is for holding the output by the adder as integrated data. The off set circuit (for example, an offset value=50) is a circuit for subtracting a specified value from the integrated value of the integrating register, and is for cutting the direct current component of the integrated value for the later FFT operation. The integrated value memory stores a specified number (for example, 128) of integration results of each bit (sampling timing) after the offset. The FFT module performs the FFT operation for each bit while the specified number of integration results are used as input data.

Next, the operation of the FPGA will be described. First, as shown in FIG. 3B, on the basis of the outer unit clock signal, the transmission signal is raised and is made to fall after one clock. At the same time as the rising of the transmission signal, the shift signals whose number is the bit number of the shift register and synchronous to the clock signal are outputted. On the basis of the shift signals, the shift register holds the binary data outputted by the comparator circuit in the respective bits. Subsequently, after the shift signals whose number is the bit number of the shift register are outputted, the addition signal is outputted. On the basis of this signal, the adder performs an addition processing. After this operation is repeated a specified number of times (for example, 100), the integration completion signal is outputted, and through the offset circuit at the respective bits, the integrated value after the offset is transferred to the integrated value memory, and the value of the integrating register is cleared.

When the specified number of integration results are stored in the integrated value memory, the FFT module performs the FFT operation for the respective bits.

When the FFT operation is ended for all the bits, an FFT processing end signal is transmitted from the FFT module to the timing control circuit, and when receiving the signal, the timing control circuit transmits the signal to the CPU. When receiving the FFT processing end signal, the CPU reads out the FFT operation results of the respective bits.

Next, a description will be given to a processing in the CPU constructed of the maximum amplitude component extraction unit 207, the detection threshold setting unit 208, the peak detection unit 209, the distance/relative speed operation unit 210, the warning object judgment unit 211 and the warning judgment unit 212.

Figure 4:
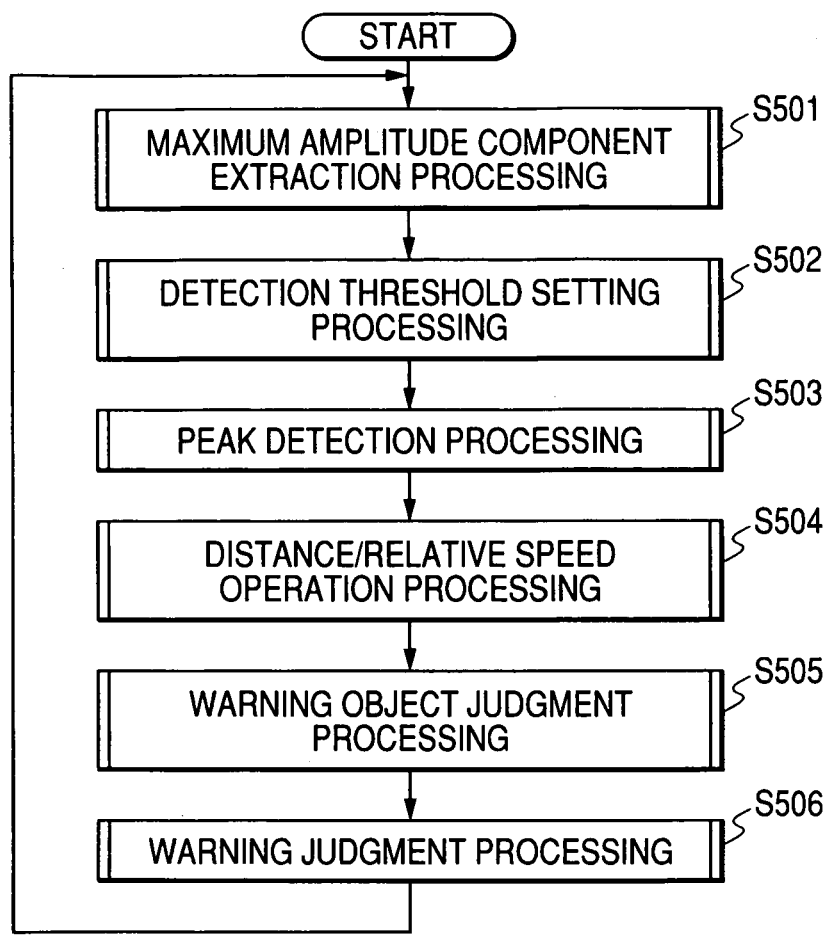
FIG. 4 is a flowchart for explaining an outline of a processing in a CPU of the embodiment 1.

FIG. 4 shows a flowchart of the processing in the CPU.

S501: With respect to an FFT operation result at each sampling timing, a maximum amplitude value and its frequency component are obtained.

S502: A detection threshold is set on the basis of the maximum amplitude value at each sampling timing.

S503: A peak exceeding the detection threshold is detected on the basis of the maximum amplitude value at each sampling timing.

S504: A distance is calculated from a peak timing, and a relative speed is calculated from a frequency component at the peak timing.

S505: It is judged whether or not a detected material body is a warning object for a driver.

S506: A warning is given to the driver.

Next, the maximum amplitude component extraction processing S501 will be described in detail.

Figure 5:
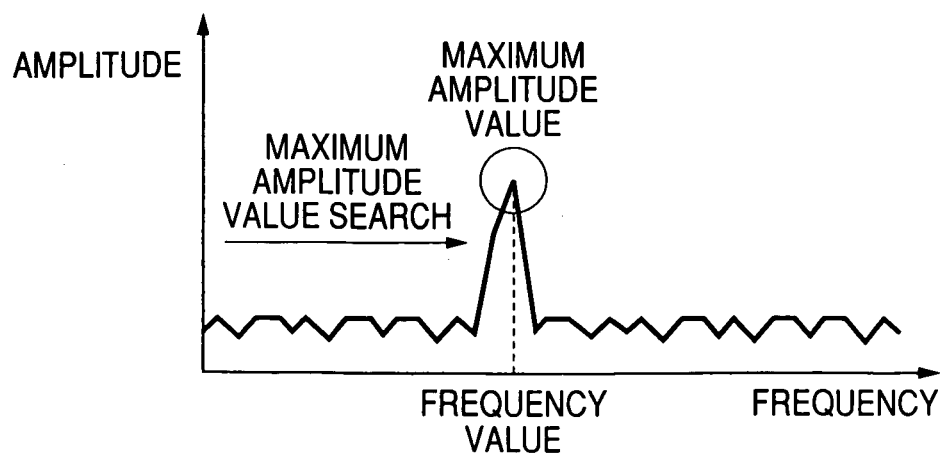
FIG. 5 is a view for explaining a maximum amplitude component extraction processing of the embodiment 1.

FIG. 5 shows an example of the FFT operation result (after amplitude calculation) at a certain sampling timing. As shown in the drawing, for example, a search is made for the maximum amplitude value from the low frequency side, and the maximum amplitude value and its frequency are obtained.

In the case where the sample interval of the time series data inputted to the FFT processing is 100 µs, and the number of FFT points is 128, an observation time becomes 100 µs×128=12.8 ms, and accordingly, a frequency (frequency pitch) corresponding to one frequency bin of the FFT operation result becomes 78.125 Hz. Thus, for example, in the case where the fifth frequency bin is the maximum amplitude, the frequency value becomes 5×78.125=390.625 [Hz].

Figure 6:
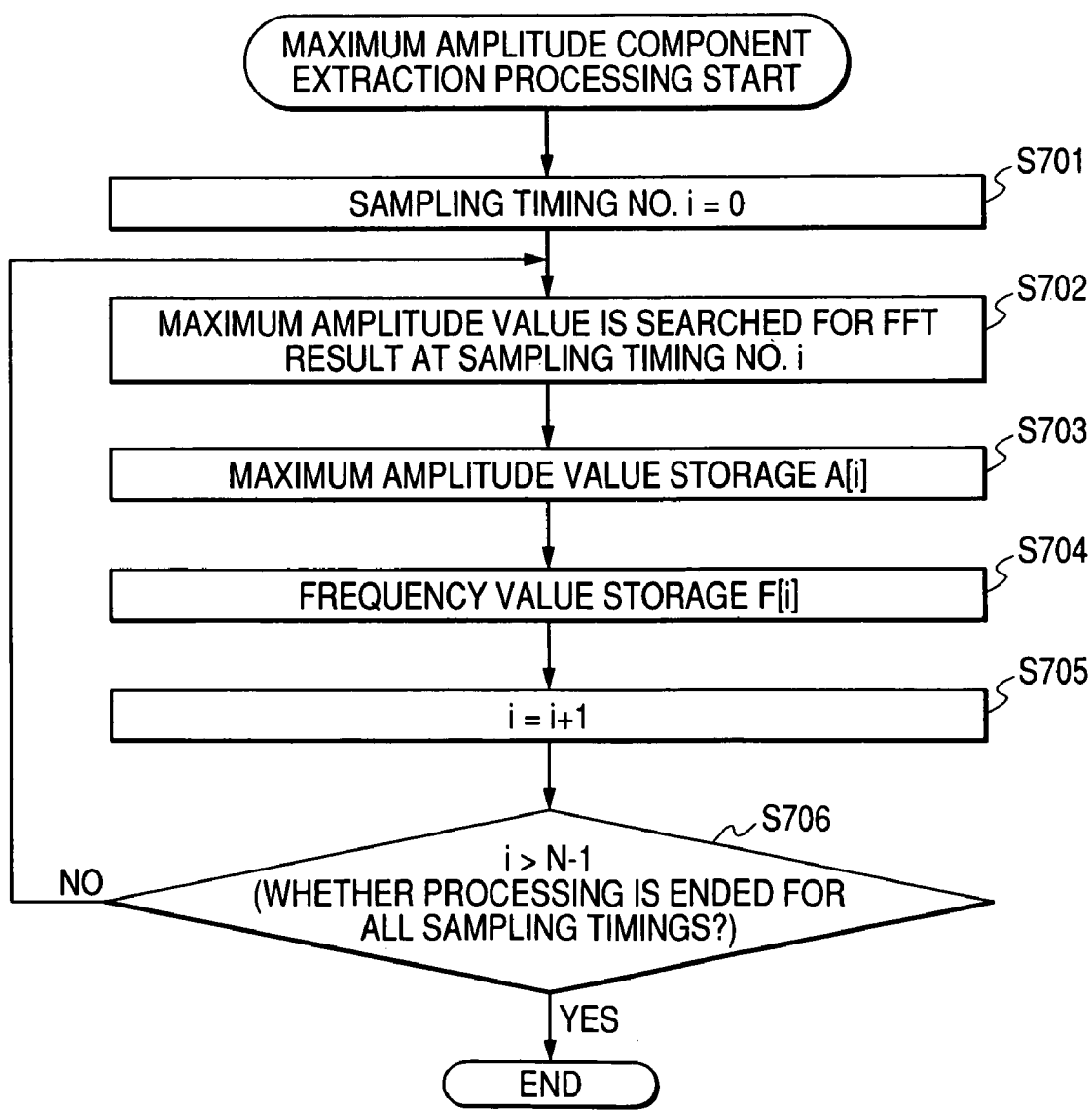
FIG. 6 is a flowchart of the maximum amplitude component extraction processing of the embodiment 1.

FIG. 6 shows a flowchart of the maximum amplitude extraction processing S501.

S701: Sampling timing No. i at which a search for a maximum amplitude value is made is initialized.

S702: The FFT operation result at the sampling timing No. i is searched for the maximum amplitude value.

S703: The maximum amplitude value is stored (stored in, for example, a register A[i].

S704: A frequency value at which the maximum amplitude is obtained is stored (store in, for example, a register F[i])

S705: The sampling timing No. is incremented.

S706: The end of the maximum amplitude value search is checked for all sampling timings.

Hereinafter, with respect to each sampling timing, the stored maximum amplitude value (A[i]) is simply called "amplitude value".

Next, the detection threshold setting processing S502 will be described in detail.

With respect to each sampling timing, a temporal moving average value of amplitude values is obtained, a previously set constant value is added to the moving average value, and the resultant value is made the detection threshold.

Figure 7:
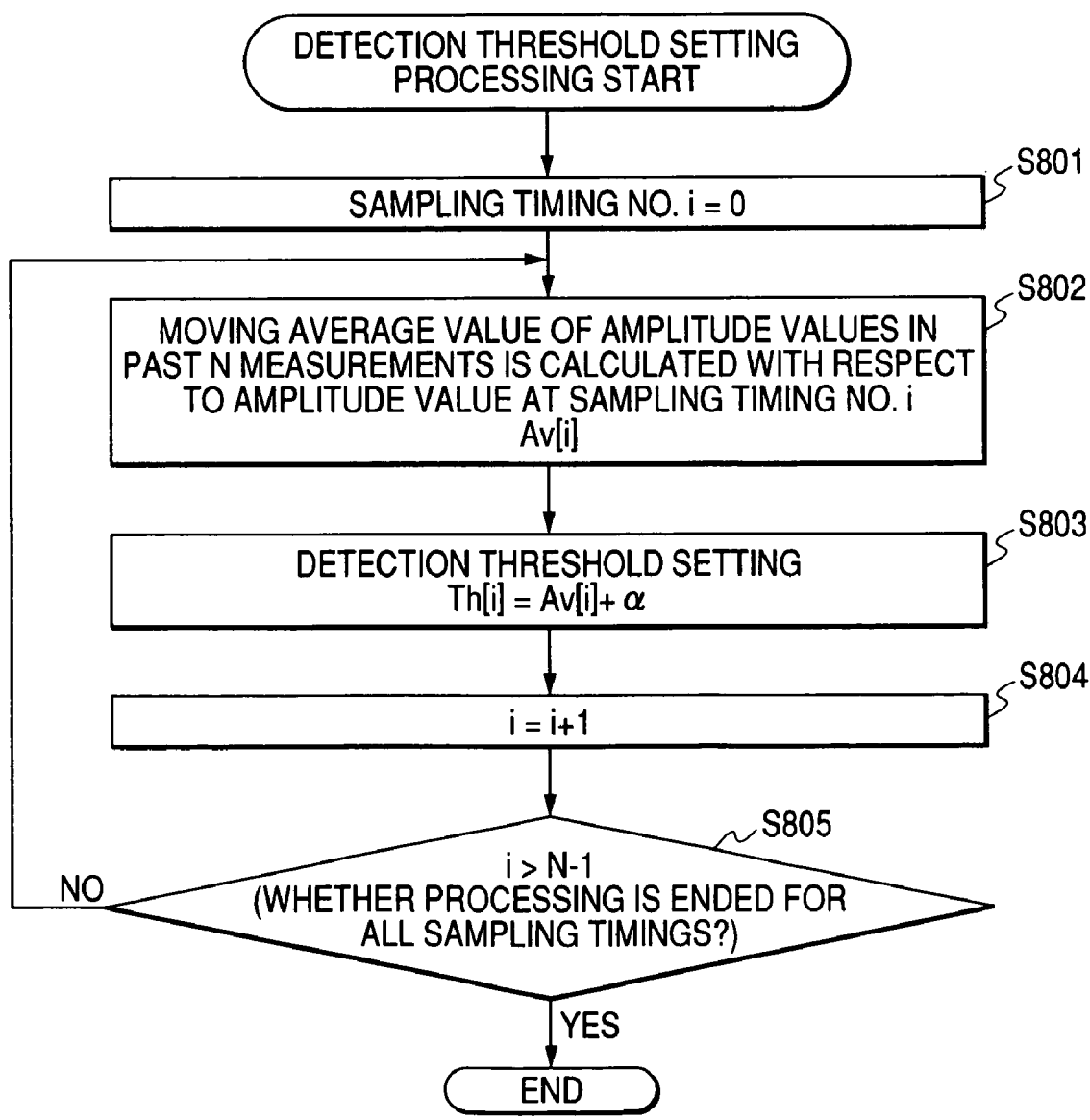
FIG. 7 is a flowchart of a detection threshold setting processing of the embodiment 1.

FIG. 7 shows a flow chart of the detection threshold setting processing S502.

S801: The sampling timing No. i is initialized.

S802: With respect to the sampling timing No. i, a moving average value of past amplitude values (for N measurements) is calculated (Av[i]).

S803: A previously set constant value a is added to the moving average value Av[i], and the resultant value is made the detection threshold.

S804: The sampling timing No. is incremented.

S805: With respect to all sampling timings, the end of the detection threshold setting is checked.

Incidentally, here, with respect to each sampling timing, the moving average value of the amplitude values is obtained, and the value obtained by adding the specified value is made the detection threshold. However, at all sampling timings, a previously set specified value may be made the detection threshold.

Next, the peak detection processing S503 will be described in detail.

Figure 8:
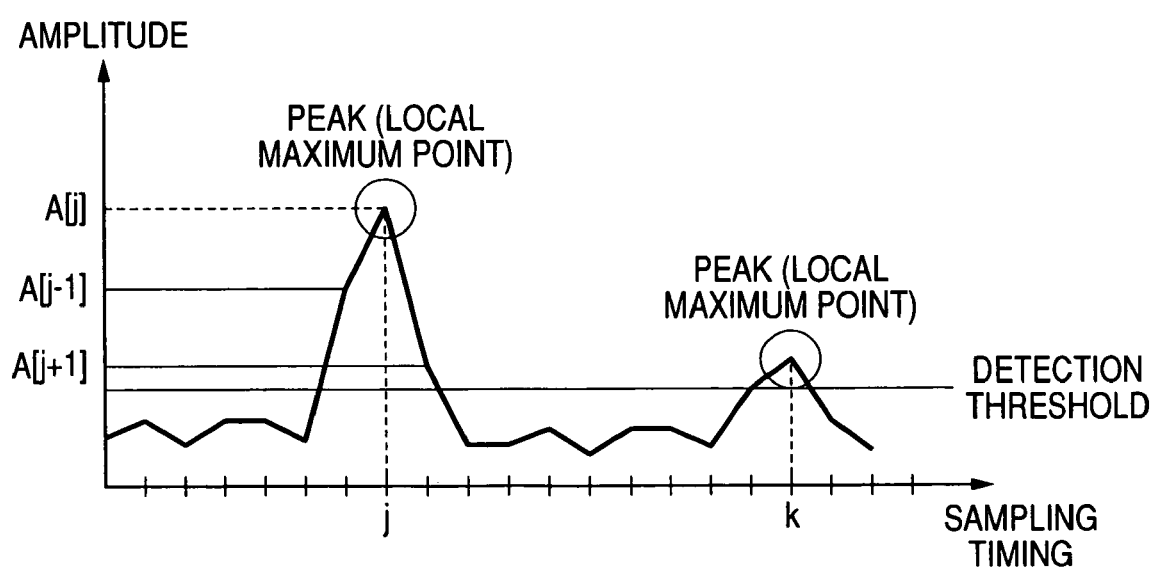
FIG. 8 is a view for explaining a peak detection processing of the embodiment 1.

FIG. 8 shows a state of peak detection. As shown in the drawing, a local maximum point exceeding the detection threshold is made a peak, and its sampling timing and an amplitude value (the peak timing and timings before and after that) are stored (j, k, A[j], A[j−1], A[j+1], A[k], A[k−1], A[k+1]). Further, a frequency value at the peak timing obtained at the maximum amplitude component extraction processing S501 is also stored (F[j], F[k]).

Figure 9:
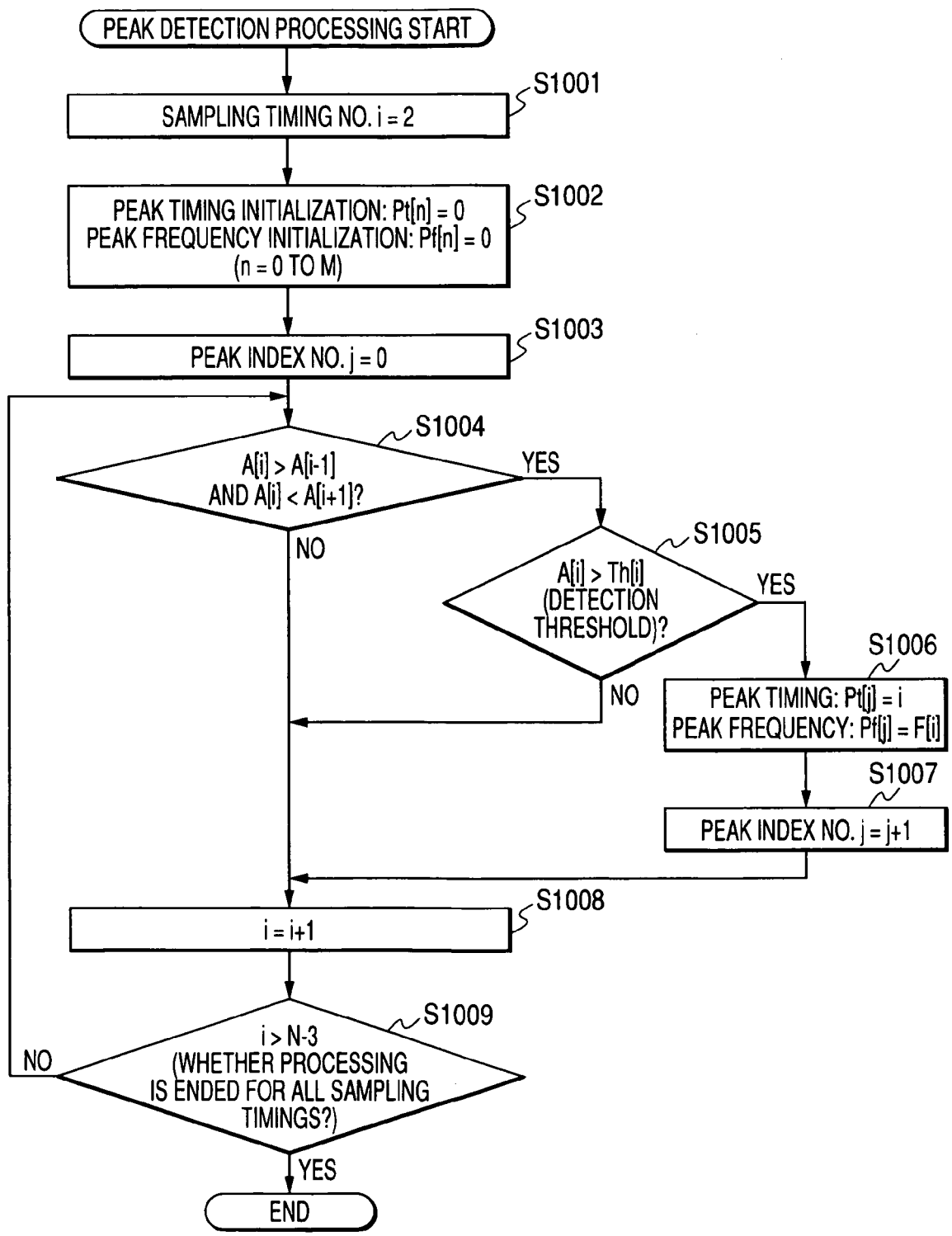
FIG. 9 is a flowchart of the peak detection processing of the embodiment 1.

FIG. 9 shows a flowchart of the peak detection processing S503.

S1001: The sampling timing No. i is initialized.

S1002: Peak timing (Pt[n]), peak level (Pa[n]), and peak frequency (Pf[n]) are initialized (=0). Where, n=0 to M.

S1003: The arrangement number (hereinafter, index) of a register for storing the peak information (peak timing, peak level, and peak frequency) is initialized (j=0).

S1004: A comparison is made with the amplitude value at the sampling timing one before and the amplitude value at the sampling timing one after, and it is checked whether or not the value is maximum at the sampling timing i. In the case where it is maximum, the procedure proceeds to S1005, and in the case of not, the procedure proceeds to S1008.

S1005: The amplitude value at the sampling timing i is compared with the detection threshold, and in the case where it is larger than the detection threshold, the procedure proceeds to S1006, and in the other case, the procedure proceeds to S1008.

S1006: Since the amplitude value at the sampling timing i is maximum and larger than the detection threshold, the peak information is stored in the register (Pt[j]=i, Pa[j]=A[i], Pf[j]=F[i], where F[i] is a frequency value obtained at S501).

S1007: The peak index No. (j) is incremented.

S1008: The sampling timing No. (i) is incremented.

S1009: With respect to all sampling timings (where, i=2 to N−2), it is checked whether or not the processing is ended. In the case where it is not ended, the procedure returns to S1004, and in the case where it is ended, this processing is ended.

Next, the distance/relative speed operation processing S504 will be described in detail.

The distance and the relative speed are calculated from the peak information obtained at the peak detection processing S503.

Figure 10:
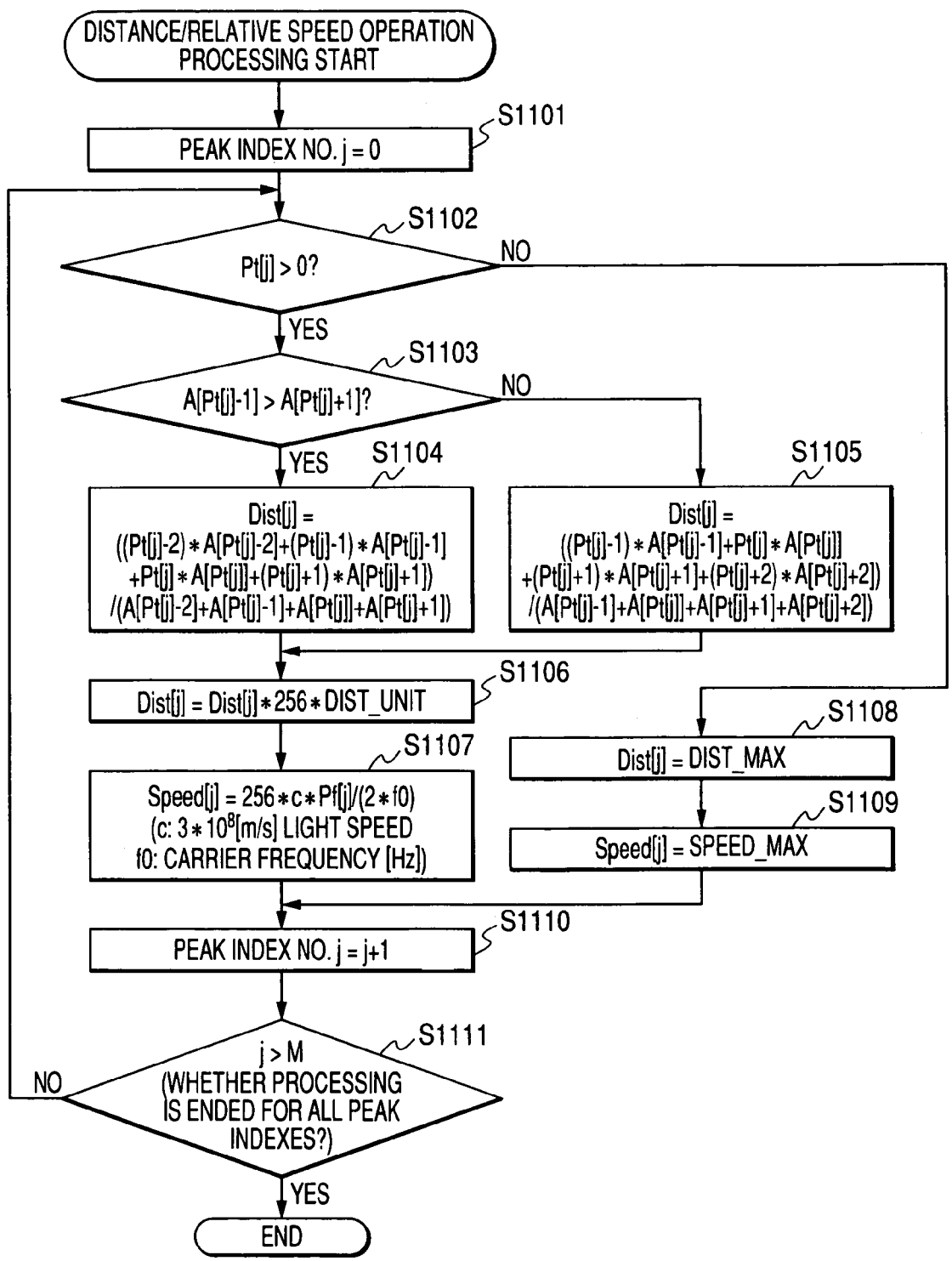
FIG. 10 is a flowchart of a distance/relative speed operation processing of the embodiment 1.

FIG. 10 shows a flowchart of the distance/relative speed operation processing S504.

S1101: The peak index No. is initialized (j=0).

S1102: It is judged whether or not the peak timing (Pt[j]) is 0, that is, it is judged whether or not the peak exists. In the case where the peak exists, the procedure proceeds to S1103, and in the case where the peak does not exist, the procedure proceeds to S1108.

S1103: Amplitude values (A[Pt[j]−1], A[Pt[j]+1]) at sampling timings at both sides of the peak timing (Pt[j]) are compared with each other, and in the case where the amplitude value at the left adjacent sampling timing is larger than the amplitude value at the right adjacent sampling timing, the procedure proceeds to S1104, and in the other case, the procedure proceeds to S1105.

S1104: In addition to Pt[j], amplitude values (A[Pt[j]], A[Pt[j]−2], A[Pt[j]−1], A[Pt[j]+1]) at sampling timings of Pt[j]−2, Pt[j]−1, and Pt[j]+1 are used, and a weighted average is obtained.

S1105: In addition to Pt[j], amplitude values (A[Pt[j]], A[Pt[j]−1], A[Pt[j]+1], A[Pt[j]+2]) at sampling timings of Pt[j]−1, Pt[j]+1, and Pt[j]+2 are used, and a weighted average is obtained.

S1106: The weighted average is multiplied by a distance DIST_UNIT corresponding to one sampling, and is multiplied by 256 in order to make a unit [m/256].

S1107: The relative speed is calculated from the frequency value (Pf[j]) at the peak timing (Pt[j]). An expression 1 is used for calculation of the relative speed.

$$\text{(relative speed)} = \frac{\text{(light speed)} \times \text{(Doppler frequency)}}{(2 \times \text{carrier frequency})} \quad \text{(expression 1)}$$

For example, in the case of
light speed=$3 \times 10^8$ [m/s],
Doppler frequency=1340 [Hz], and carrier frequency=24.125 [GHz],
relative speed=8.3 [m/s] (=30 [km/h]).

Here, in order to make a unit [m/s/256], it is multiplied by 256.

Incidentally, the frequency value Pf[j] is calculated from the FFT operation result at the maximum amplitude component extraction processing S501.

S1108: This is a processing in the case where a peak does not exist, and DIST_MAX is made a distance value (Dist[j]).

S1109: SPEED_MAX is made a relative speed value (Speed[j]).

S1110: The peak index is incremented.

S1111: It is checked whether or not the processing is ended on all peak indexes. In the case where it is not ended, the procedure returns to S1102.

Incidentally, here, although the weighted average is used with respect to the amplitude values before and after the peak, another method may be used to interpolate the distance.

Next, the warning object judgment processing S505 will be described in detail.

First, a recognition method of a material body approaching from in front of an own vehicle will be described.

Figure 11A:
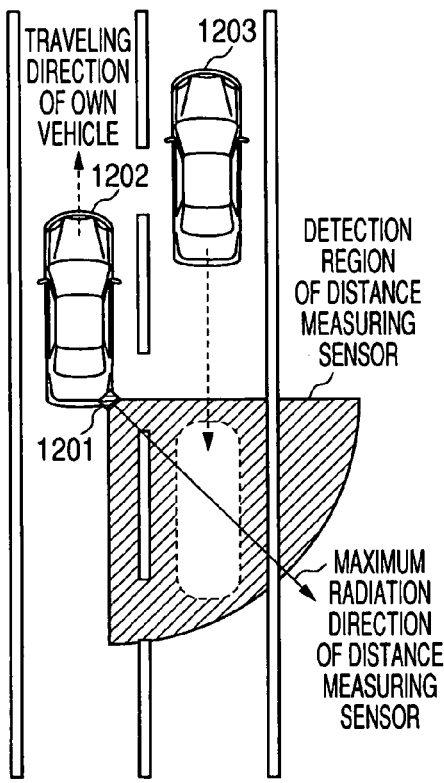
FIGS. 11A to 11D are time charts showing a distance change of a distance measuring sensor according to the peripheral state of an own vehicle of the embodiment 1.
Figure 11B:
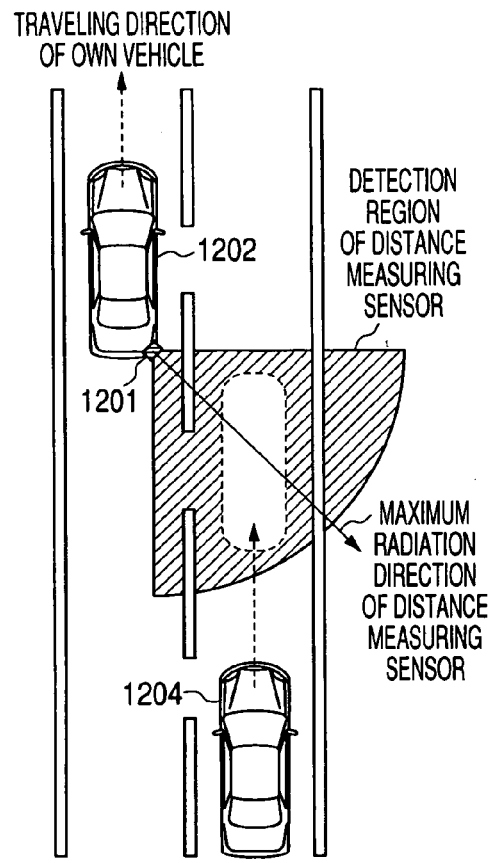

As shown in FIGS. 11A and 11B, a distance measuring sensor 1201 is mounted at a corner of a vehicle, and is mounted so that the maximum radiation direction (direction in which the antenna gain becomes maximum) of the distance measuring sensor 1201 is directed to an oblique rear portion inclined by 45 degrees with respect to an own vehicle 1202. Besides, the viewing angle of the distance measuring sensor 1201 used in the description of this embodiment is 90 degrees.

Figure 11C:
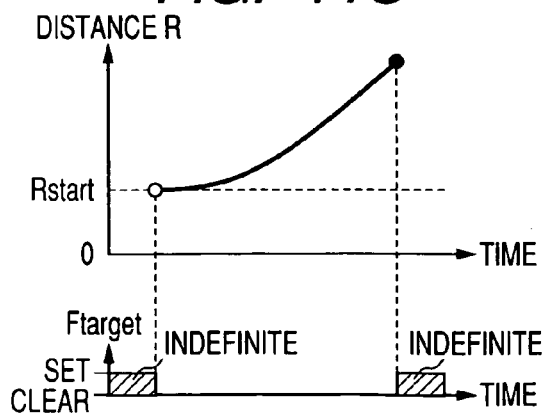
Figure 11D:
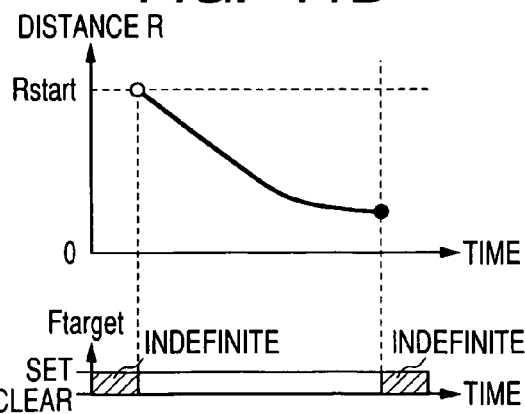

In this case, as shown in FIG. 11A, in the state where the own vehicle 1202 and a vehicle 1203 approaching from front on the adjacent lane pass each other, the shape of a temporal change of a distance R becomes as shown in FIG. 11C. On the other hand, as shown in FIG. 11B, in the state where a vehicle 1204 approaching from behind on the adjacent lane overtakes the own vehicle, the shape of a temporal change of the distance R becomes as shown in FIG. 11D.

As stated above, the material body approaching from in front of the own vehicle can be recognized by following the temporal change of the distance R.

Next, a Doppler frequency included in a reflected wave from a material body approaching from in front of the own vehicle will be described.

Figure 12:
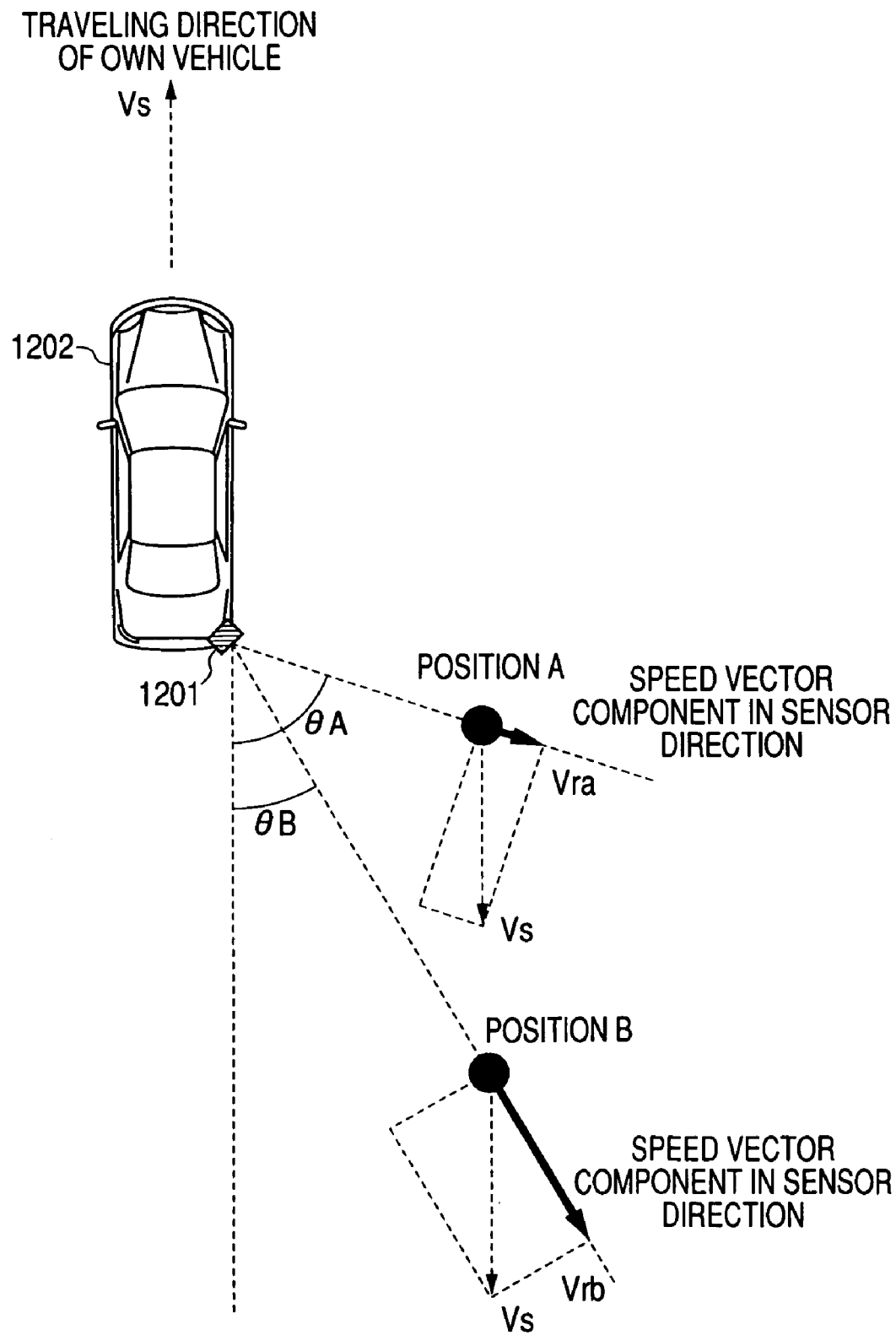
FIG. 12 is a view for explaining the peripheral state of the own vehicle of the embodiment 1.

FIG. 12 is a model view of a case where the material body approaching from in front of the own vehicle is detected. Here, there is shown a state in which the material body approaches from in front of the own vehicle and goes off into the distance. For example, in the case of a position A, a speed vector component Vra in the sensor direction becomes Vs*cos θA and is relatively small, whereas in the case of a position B, a speed vector component Vrb in the sensor direction becomes Vs*cos θB and is a value larger than Vra. As the body goes rearward, the speed vector component approaches Vs. In any cases, the Doppler frequency corresponding to the speed vector is included in the reflected wave.

Figure 13:
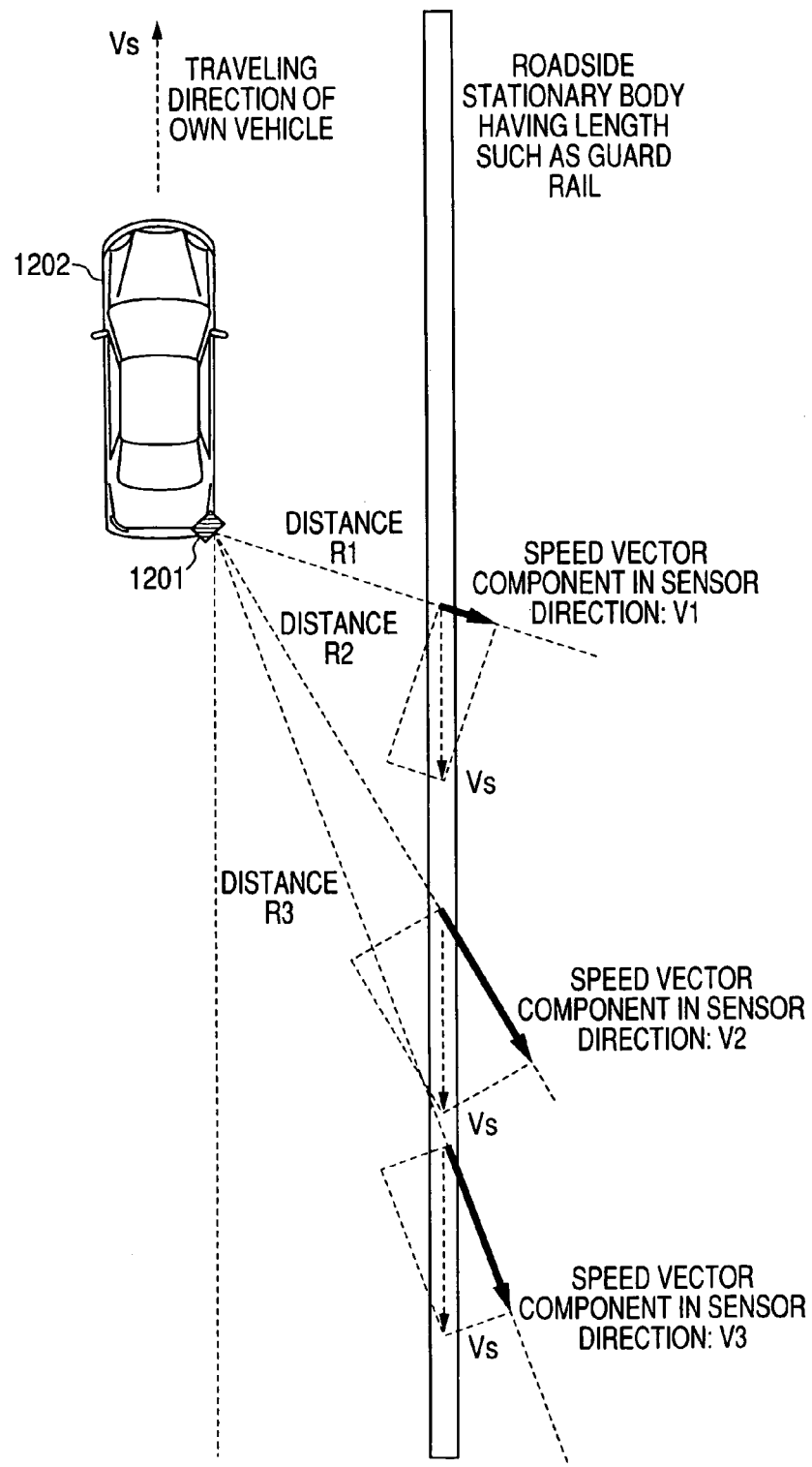
FIG. 13 is a view for explaining the peripheral state of the own vehicle of the embodiment 1.

Besides, as shown in FIG. 13, in the case where the vehicle travels along a stationary body having a length, such as a guard rail, even in the case where detection is made at a distance R1, there is a reflected wave from a position farther than the position of the distance R1, a comparatively large speed vector component in the sensor direction exists in the reflected wave from such a far position, and the Doppler frequency corresponding to that exists.

Accordingly, with respect to the detected body approaching from front, a frequency threshold according to the speed of the own vehicle is provided for the Doppler frequency included in the reflected wave, and when a frequency component exceeding the threshold exists, it is judged that the reflection occurs from a stationary body having a length, such as a roadside guard rail, and it is not made a warning object, and therefore, an annoying erroneous warning can be suppressed.

On the other hand, in the case where a vehicle existing in the blind spot is detected, since the Doppler frequency included in the reflected wave becomes very small, it can be made a warning object.

Figure 14:
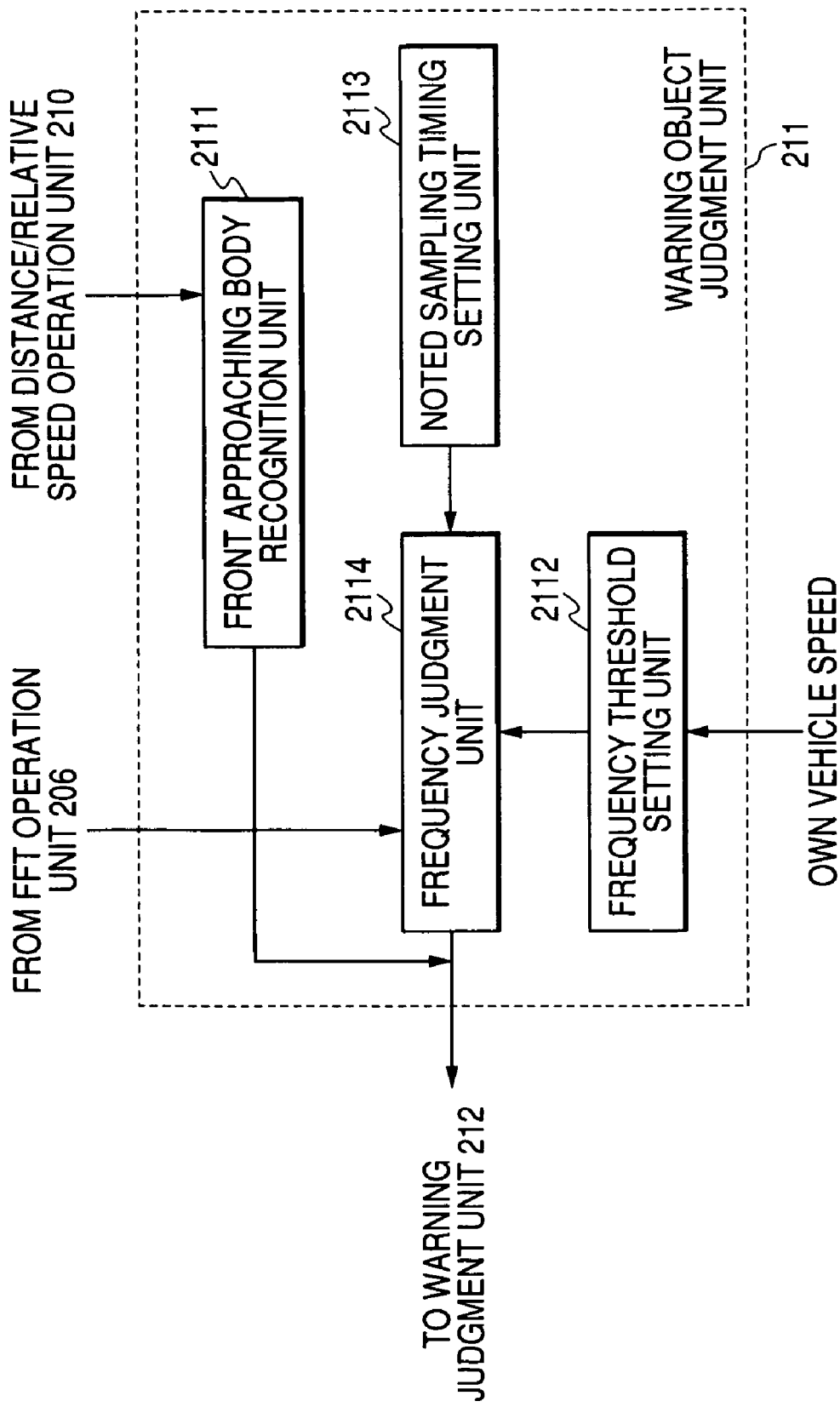
FIG. 14 is a view showing a block structure of a warning object judgment processing part of the embodiment 1.

FIG. 14 shows a block diagram of the warning object judgment unit 211. In FIG. 14, the warning object judgment unit 211 includes a front approaching body recognition unit 2111 for recognizing, from a temporal history of distance, a material body approaching from in front of the own vehicle, a frequency threshold setting unit 2112 for setting a threshold for the Doppler frequency according to the own vehicle speed, a noted sampling timing setting unit 2113 for setting a noted sampling timing on the basis of a peak timing obtained by the peak detection unit, and a frequency judgment unit 2114 for judging whether or not a frequency component not lower than the frequency threshold set by the frequency threshold setting unit 2112 exists with respect to the FFT operation result at the noted sampling timing. In the case where it is judged by the front approaching body recognition unit 2111 that the material body approaches from in front of the own vehicle, and when it is judged by the frequency judgment unit 2114 that a frequency component not lower than the frequency threshold exists, it is judged that this material body is the stationary body and is not the warning object.

Figure 15:
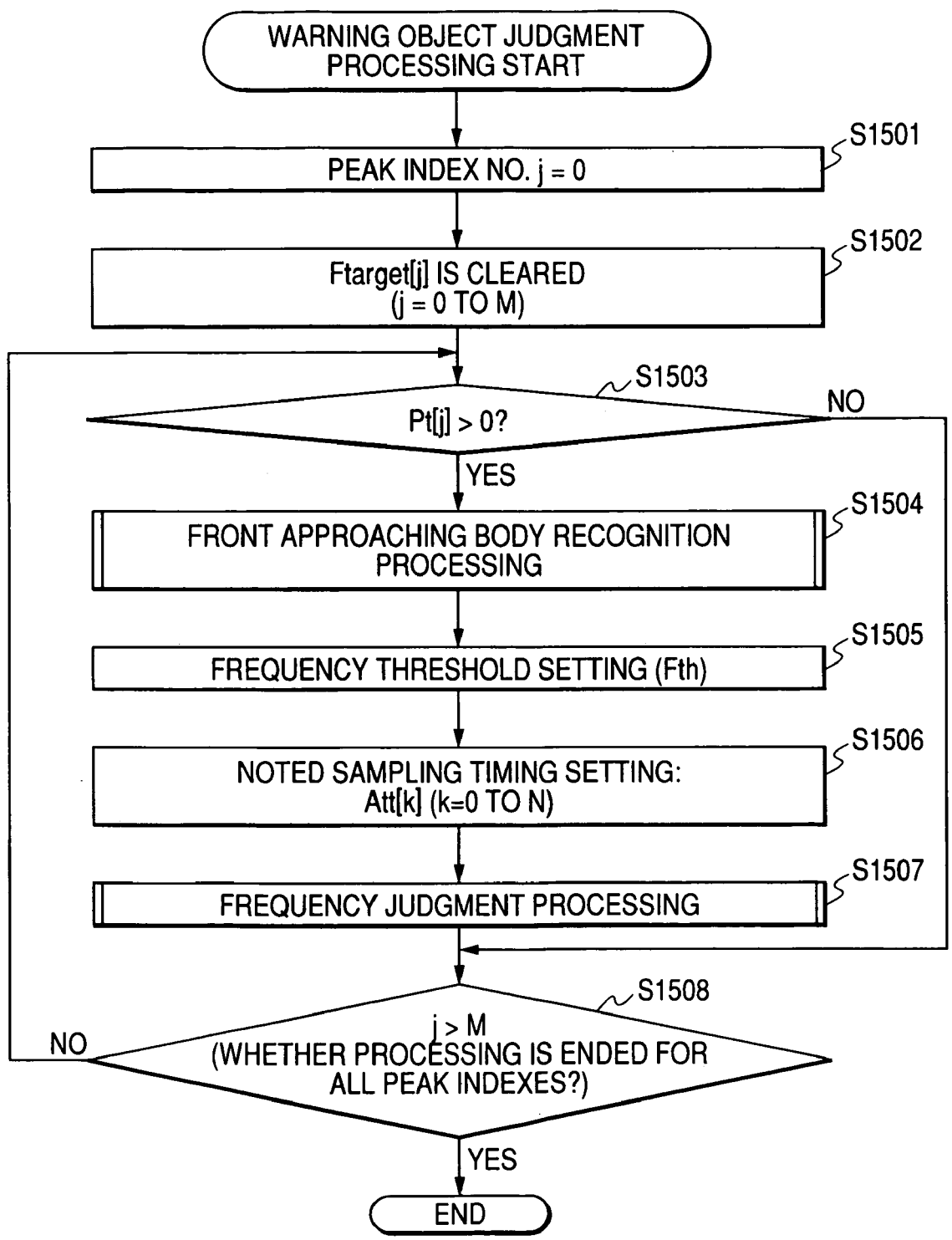
FIG. 15 is a flowchart of a warning object judgment processing of the embodiment 1.

FIG. 15 shows a flowchart of the warning object judgment processing S505.

S1501: The peak index No. (j) is cleared (j=0).

S1502: A target flag (Ftarget[j], j=0 to M, this flag is set when a material body is made a warning object) for each detection peak is cleared.

S1503: It is judged whether or not the peak timing (Pt[j]) is 0, that is, it is judged whether or not a peak exists. In the case where Pt[j] is larger than 0, that is, in the case where the peak exists, the procedure proceeds to S1504, and in the other case, the procedure proceeds to S1508.

S1504: A front approaching body recognition processing (the details will be described later). In the case where the body is recognized to be the material body approaching from front, the target flag is not set.

S1505: A threshold for the Doppler frequency is set according to the own vehicle speed. For example, in the case where the own vehicle speed is 100 km/h, 60% of the own vehicle, that is, the Doppler frequency corresponding to 60 km/h is made the threshold. Specifically, in this case, when the Doppler frequency is calculated back from the expression 1, it becomes 2681 Hz.

Figure 18:
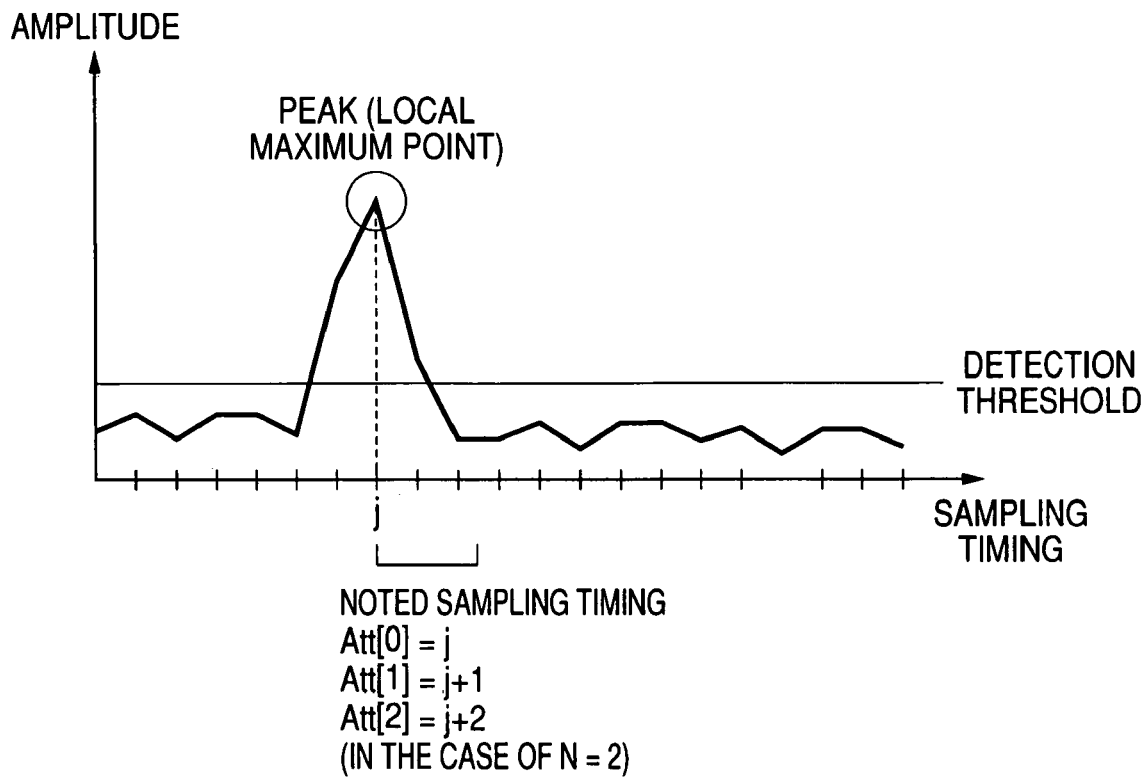
FIG. 18 is a view for explaining a warning object judgment processing of the embodiment 1.

S1506: Noted sampling timings are set. As shown in FIG. 18, the peak timing and plural adjacent sampling timings (Att[k], k=0 to N) at the farther side of the timing are made the noted sampling timings. Alternatively, except the peak timing, plural adjacent sampling timings at the farther side may be made the noted sampling timings.

S1507: A frequency judgment processing (the details will be described later). A specified amplitude threshold is set for each of the FFT operation results at the noted sampling timings, a maximum frequency of amplitudes exceeding the threshold is compared with the frequency threshold set according to the own vehicle speed, and in the case where the maximum frequency is larger, the material body is judged to be the roadside stationary body, and the target flag is not set.

S1508: It is checked whether or not the processing is ended for all the peaks. In the case where it is not ended, the procedure returns to S1503.

Figure 16:
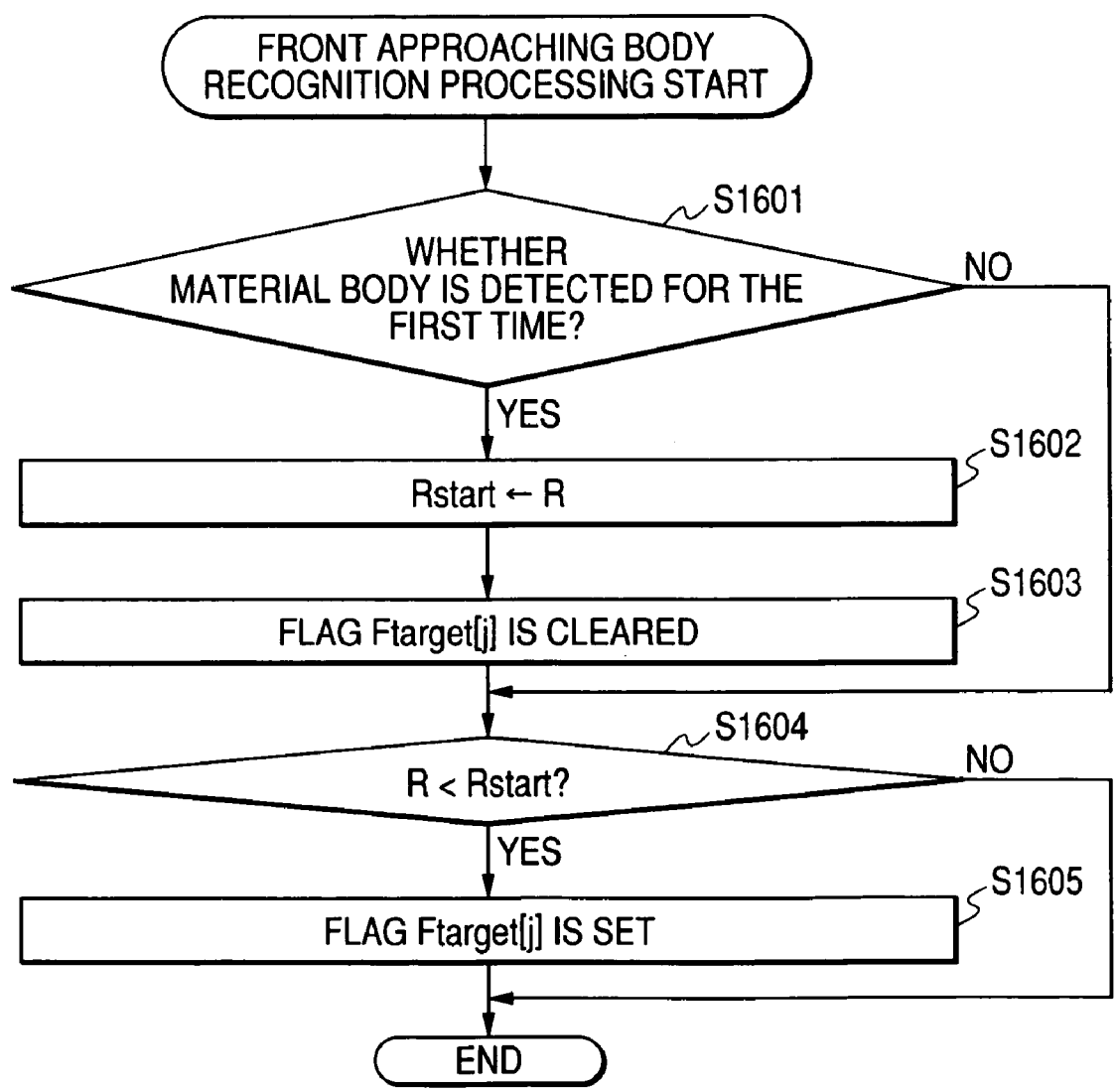
FIG. 16 is a flowchart of a front approaching body recognition processing of the embodiment 1.

FIG. 16 shows a flowchart of the front approaching body recognition processing S1504.

S1601: It is judged whether the material body is detected for the first time. When the material body is detected for the first time, the procedure proceeds to S1602, and if not, the procedure proceeds to S1604.

S1602: A front approaching body judgment distance Rstart is set to a distance R detected by the distance measuring sensor 1201 lately.

S1603: The target flag is cleared (initialization).

S1604: The front approaching body judgment distance Rstart is compared with the distance R detected by the distance measuring sensor 1201. In the case of R<Rstart, the procedure proceeds to S1605, and in the other case, the processing is ended.

S1605: It is judged that the body is the material body approaching from behind, and the target flag is set.

That is, at the front approaching body recognition processing S1504, the distance at the time when the material body is detected for the first time is made the reference distance, and in the case where there is a history including a detected distance shorter than the reference distance, this material body is recognized to be the material body approaching from behind, and in the other case, the material body is recognized to be the material body approaching from front.

Figure 17:
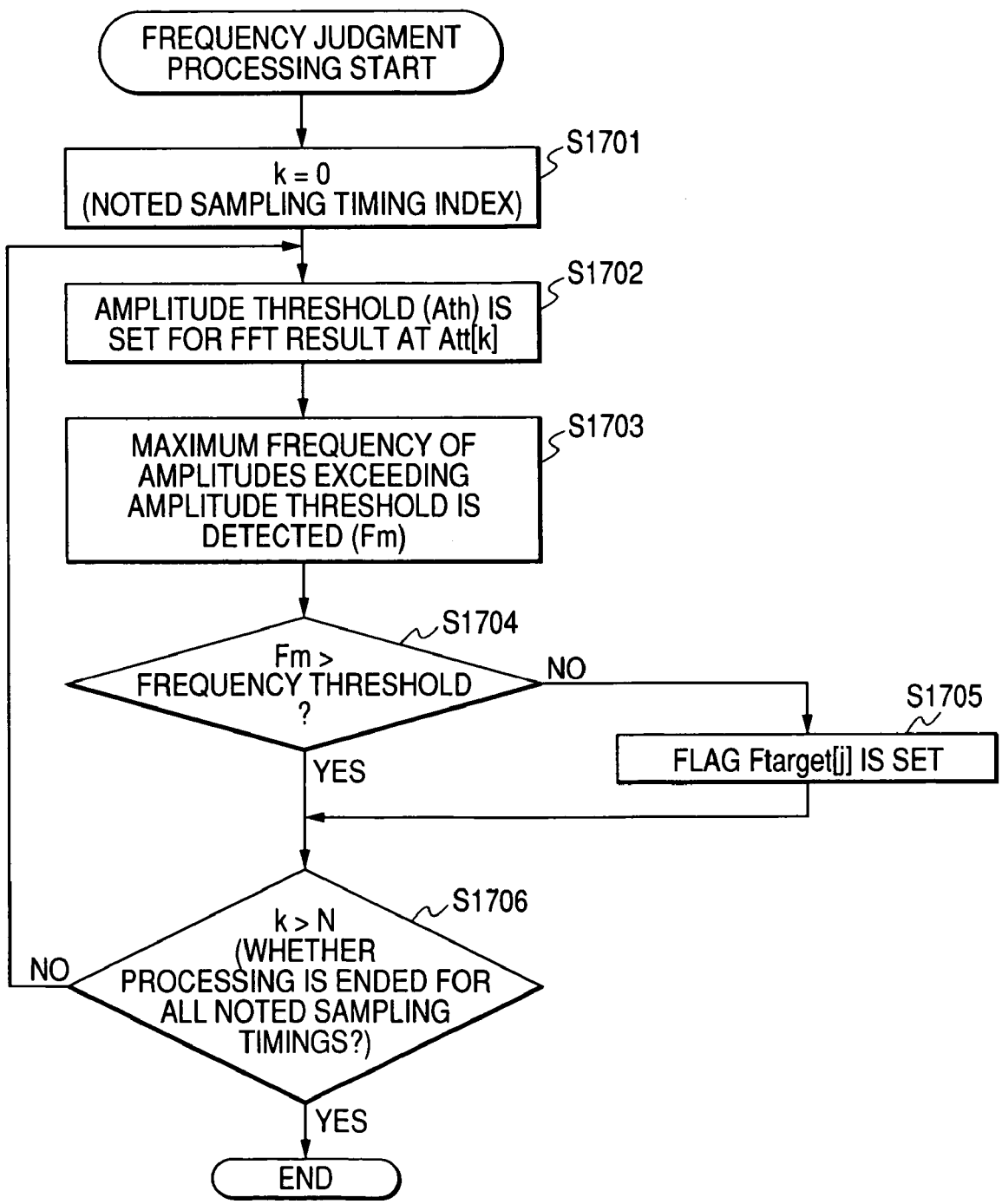
FIG. 17 is a flowchart of a frequency judgment processing of the embodiment 1.

FIG. 17 shows a flowchart of the frequency judgment processing (S1507).

S1701: The index of the noted sampling timing is cleared (k=0).

S1702: A specified amplitude threshold is set for the FFT operation result at the noted sampling timing (Att[k]).

Figure 19:
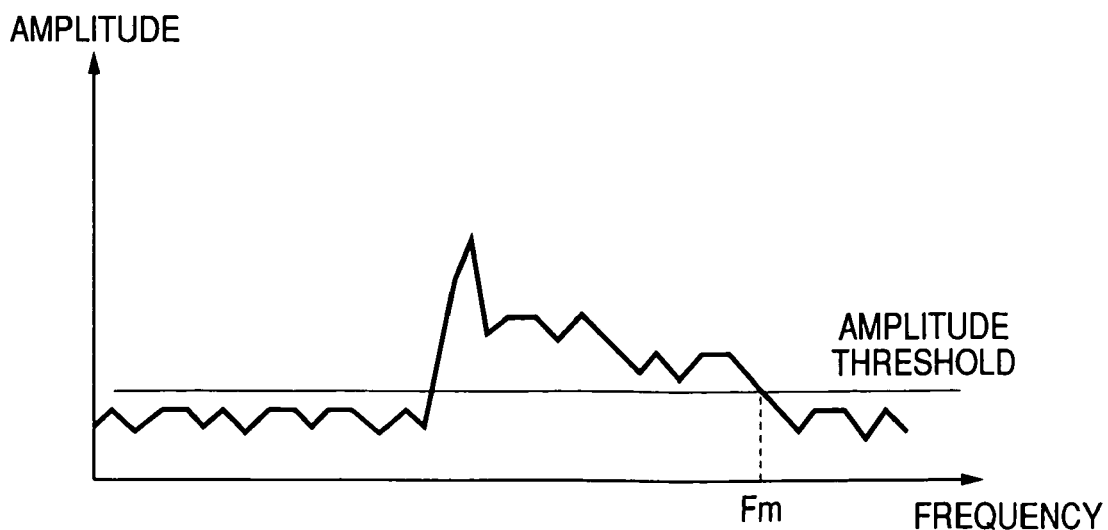
FIG. 19 is a view for explaining a frequency judgment processing of the embodiment 1.

S1703: As shown in FIG. 19, a maximum frequency (Fm) of amplitudes exceeding the amplitude threshold is detected.

S1704: The maximum frequency Fm is compared with the frequency threshold calculated at S1505, and in the case where Fm is larger, the procedure proceeds to S1706, and in the other case, the procedure proceeds to S1705.

S1705: It is judged that the body is not the stationary body, and the target flag (Ftarget[j]) is set.

S1706: It is checked whether the processing is ended on all the noted sampling timings. In the case where it is not ended, the procedure returns to S1702.

Figure 20:
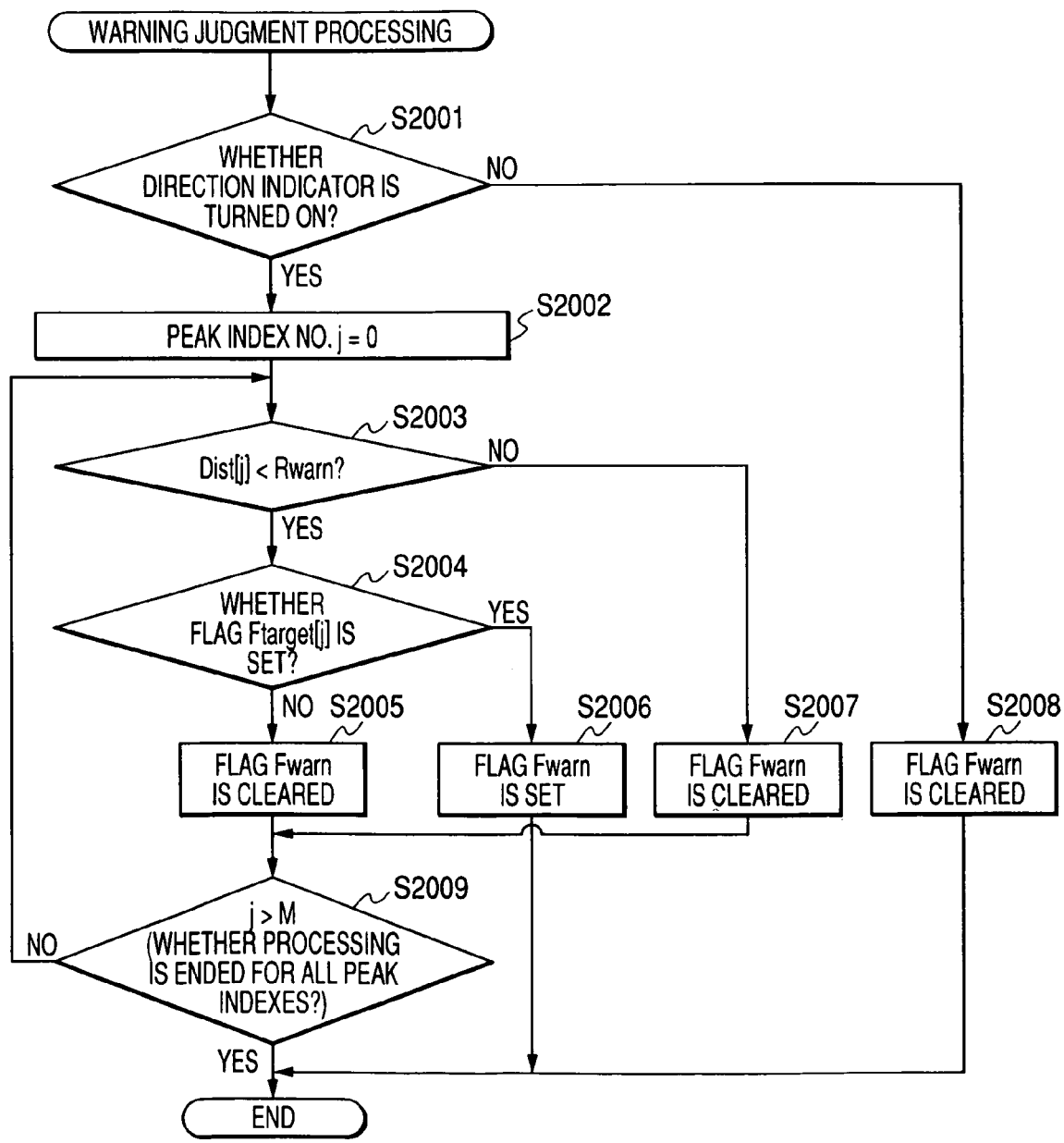
FIG. 20 is a flowchart of a warning judgment processing of the embodiment 1.

Next, the warning judgment processing S506 will be described in detail. FIG. 20 is a flowchart of this processing.

S2001: It is judged whether or not a direction indicator is in an ON state. In the case where the direction indicator is ON, the state is judged to be such that the driver requires a warning, and the procedure proceeds to S2002, and in the other case, the procedure proceed to S2008 to turn OFF the warning.

S2002: The peak index is cleared (j=0).

S2003: The distance Dist[j] detected by the distance measuring sensor 1201 is compared with a warning judgment distance Rwarn. In the case of Dist[j]<Rwarn, it is judged that the material body detected by the distance measuring sensor 1201 exists in a region where the possibility of collision with the own vehicle is high, and the procedure proceeds to S2004. In the other case, the procedure proceeds to S2007 in order to turn OFF the warning.

S2004: It is judged according to the state of the target flag (Ftarget[j]) whether or not the detected body is a warning object. When the target flag is in a set state, it is judged that the material body detected by the distance measuring sensor 1201 is the warning object for the driver, and the procedure proceeds to S2006. In the other case, the procedure proceeds to S2005 in order to turn OFF the warning.

S2005: The warning flag (Fwarn) is cleared, and the procedure proceeds to S2009.

S2006: The warning flag (Fwarn) is set, and the processing is ended.

S2007: The warning flag (Fwarn) is cleared, and the procedure proceeds to S2009.

S2008: The warning flag (Fwarn) is cleared, and the processing is ended.

S2009: It is checked whether or not the processing is ended on all peaks. In the case where the it is not ended, the procedure returns to S2003.

From the above, according to this embodiment, the stationary body such as the roadside guard rail or the wall is distinguished from the vehicle approaching from behind or the vehicle existing in the blind spot region, and a warning can be issued only in the latter case. Accordingly, there is obtained an effect that a warning unnecessary for the driver is removed and only a necessary warning can be generated.

Figure 21:
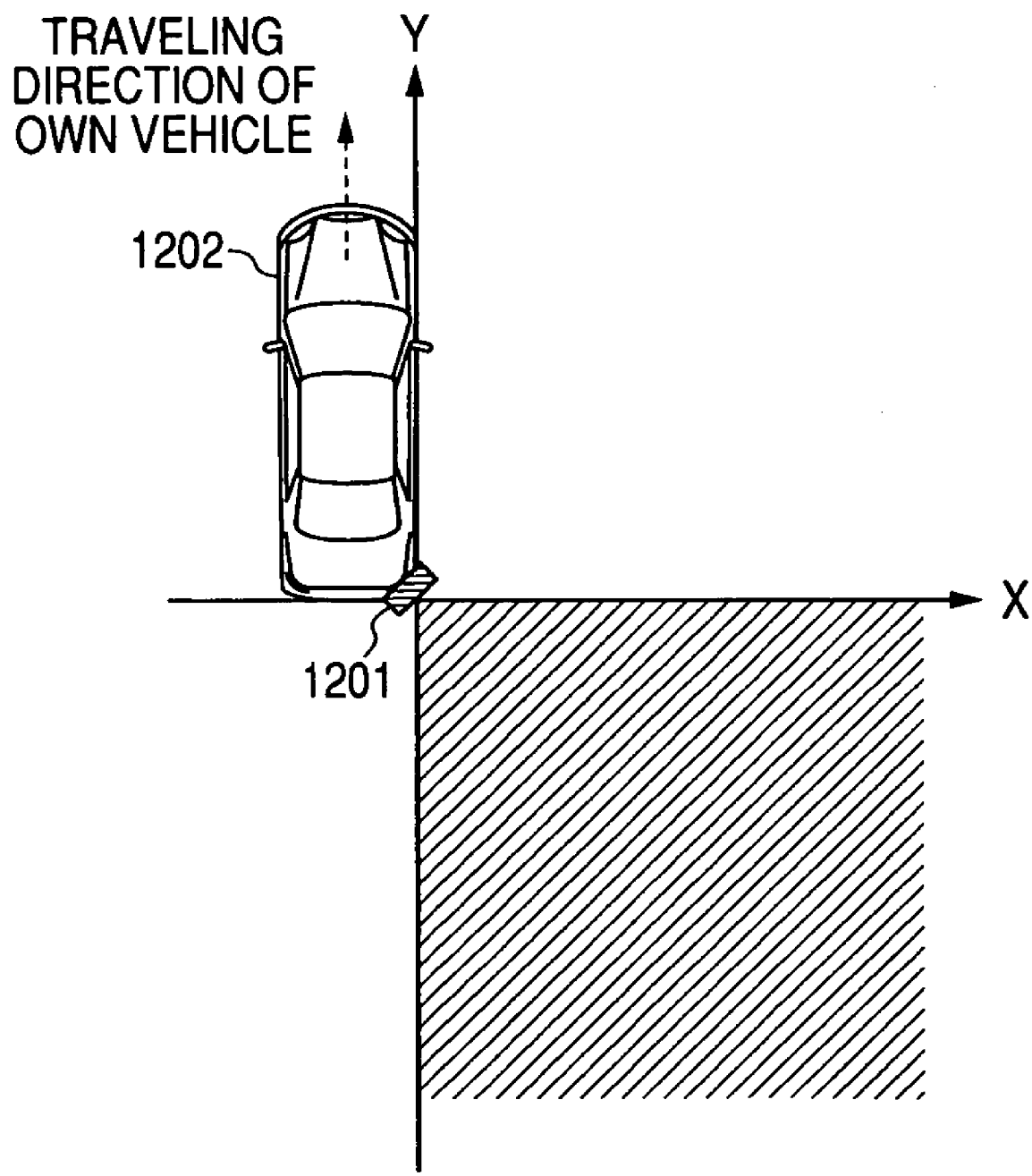
FIG. 21 is a view for explaining a visual field of a distance measuring sensor of the embodiment 1.

Incidentally, in this embodiment 1, the distance measuring sensor 1201 is mounted so that the maximum radiation direction is directed to the oblique rear portion inclined by 45 degrees with respect to the own vehicle, and the viewing angle of the distance measuring sensor 1201 is made 90 degrees. However, as shown in FIG. 21, within a range included in an oblique line region of FIG. 21 surrounded by the axis Y of the vehicle traveling direction and the axis X perpendicular to the axis Y, an arbitrary mount direction and a viewing angle can be selected.

Embodiment 2

Embodiment 2 of this invention will be described.

A structure of a vehicular rear and side warning device in the embodiment 2 is the same as FIG. 1. Besides, the flow of processing also conforms to FIG. 4, however, a method of the warning object judgment processing of S505 is different.

The warning object judgment processing of S505 according to the embodiment 2 will be described in detail. Hereinafter, only points different from the embodiment 1 will be described.

In the embodiment 1, at S1506 of FIG. 15, as shown in FIG. 18, the peak timing and the plural adjacent sampling timings at the farther side of the timing are made the noted sampling timings. On the other hand, in the embodiment 2, only the peak timing is made the noted sampling timing. For example, in FIG. 13, also in the case where reflection occurs from only the position of the distance R1, when the own vehicle speed is relatively high as in the case of freeway traveling, a speed vector component in the sensor direction becomes large, and when a suitable frequency threshold is set, it can be judged to be the roadside stationary body.

Figure 22:
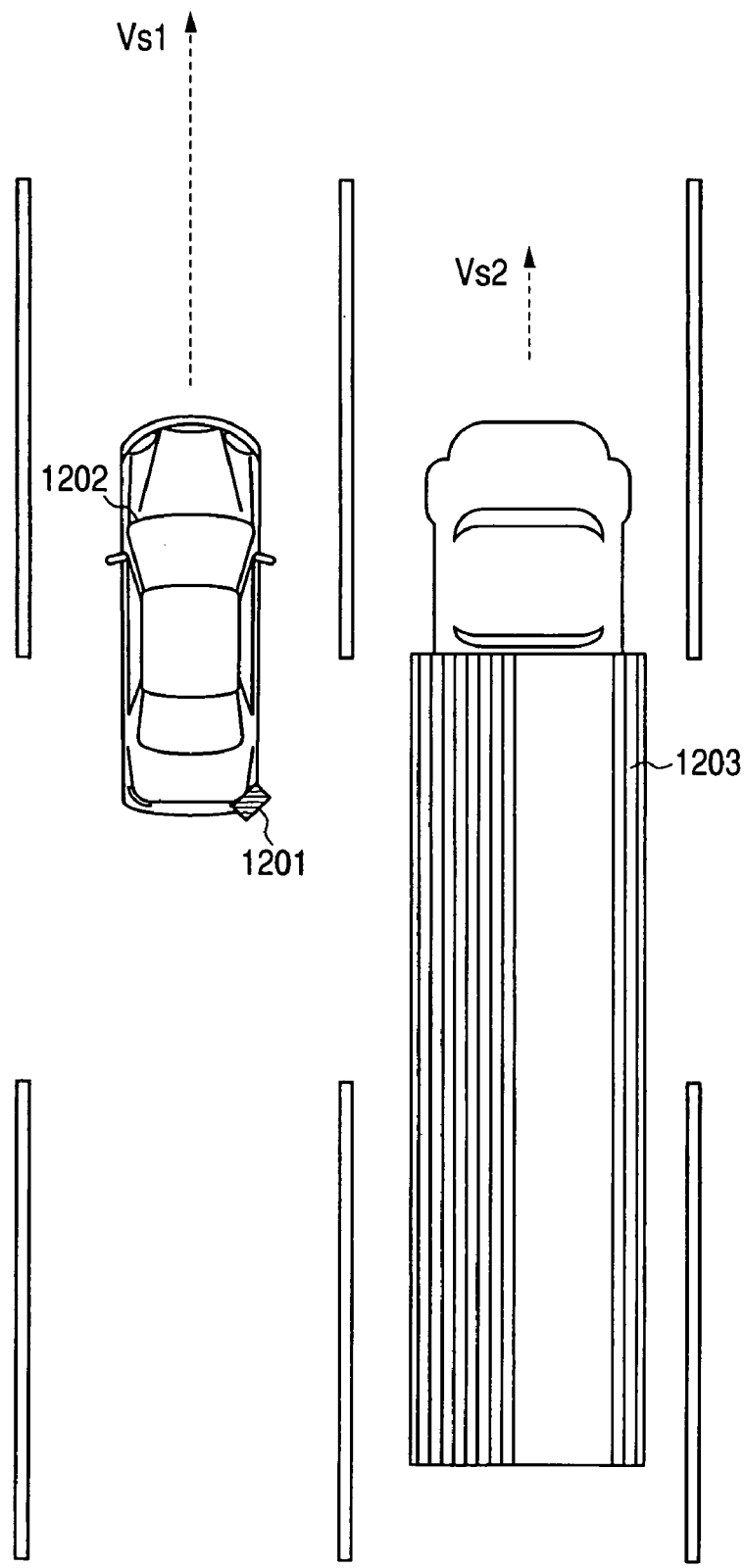
FIG. 22 is a view for explaining the peripheral state of an own vehicle of embodiment 2.
Figure 23A:
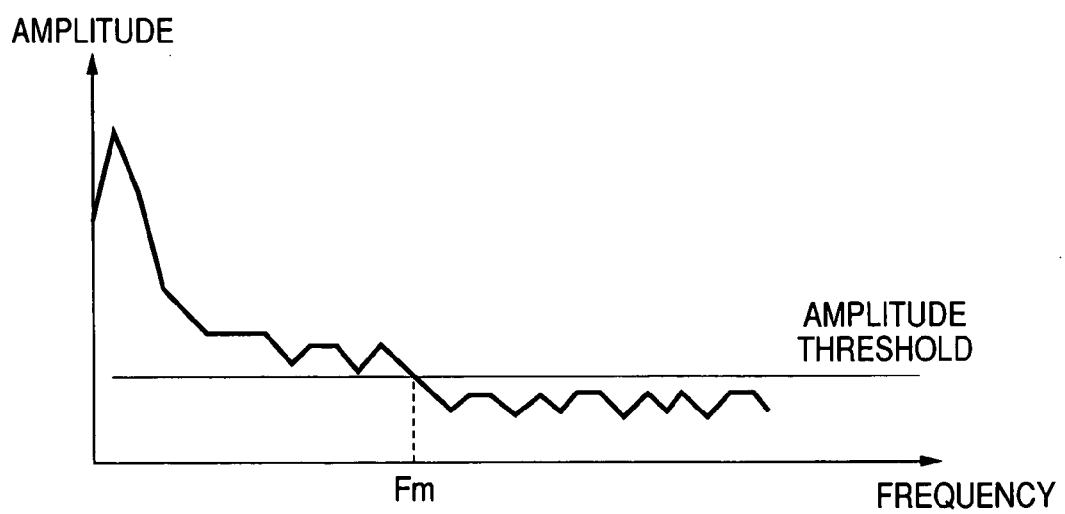
FIGS. 23A and 23B are views for explaining a frequency judgment processing of the embodiment 2.
Figure 23B:
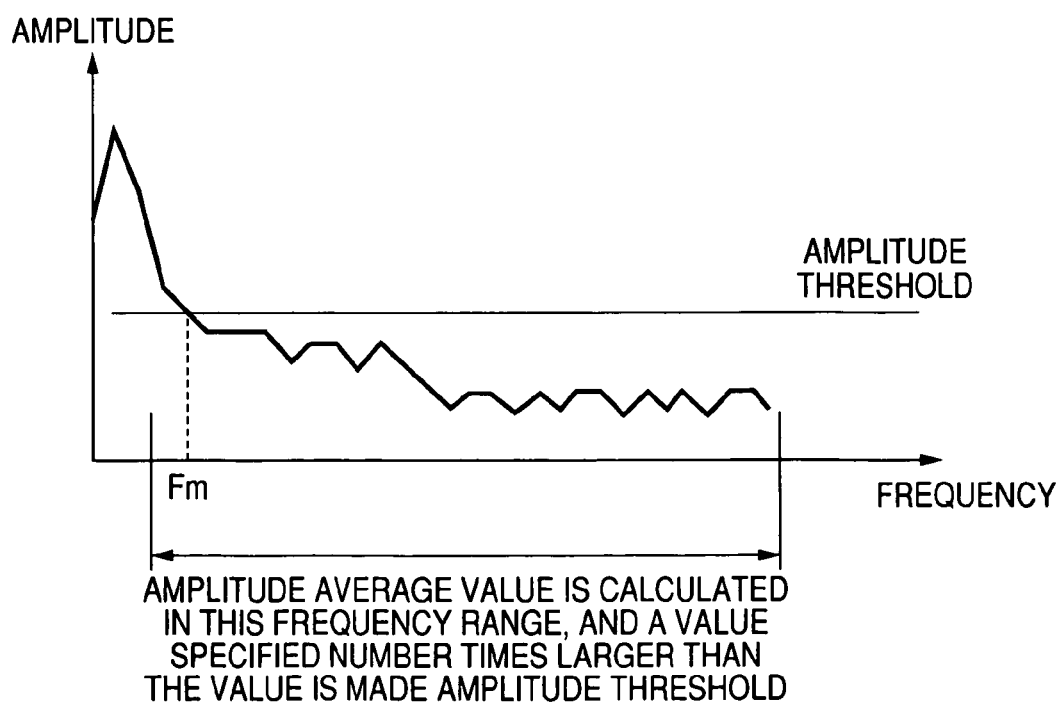

Besides, in the embodiment 1, at S1507 of FIG. 15, the specified amplitude threshold is set for the FFT operation result at each of the noted sampling timings, and the maximum frequency of amplitudes exceeding the threshold is compared with the frequency threshold set according to the own vehicle speed. However, as shown in FIG. 22, in such a situation that the own vehicle overtakes a large truck 1203 traveling on the adjacent lane, in the case where the level of a reflected wave is very large, the FFT operation result has a spread as shown in FIG. 23A, and a value of a maximum frequency (Fm) of amplitudes exceeding a specified amplitude threshold can be relatively larger. This means that the overtaking vehicle is erroneously recognized to be the stationary body such as the guard rail. In order to solve this problem, in the embodiment 2, an average amplitude value within a specified frequency range is calculated, and the amplitude threshold is set on the basis of the value (for example, the threshold is four times as large as the average amplitude value). By doing so, the maximum frequency (Fm) can be made small, and the erroneous recognition can be suppressed.

Figure 24A:
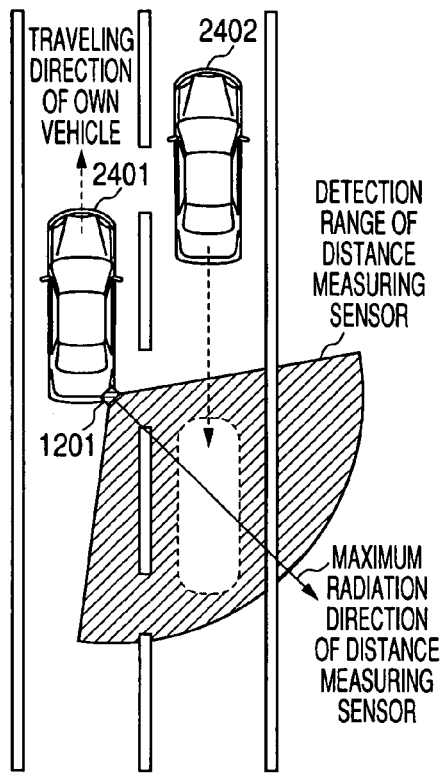
FIGS. 24A to 24D are time charts showing a distance change of a distance measuring sensor according to the peripheral state of the own vehicle of the embodiment 2.
Figure 24B:
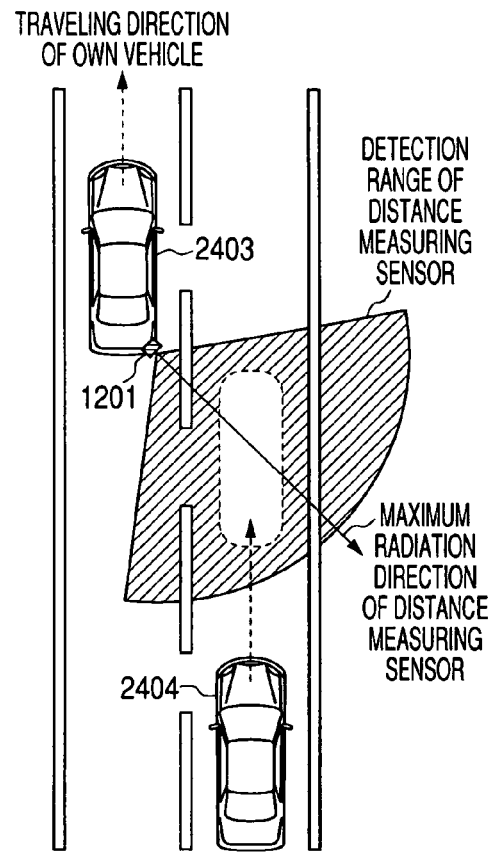
Figure 24C:
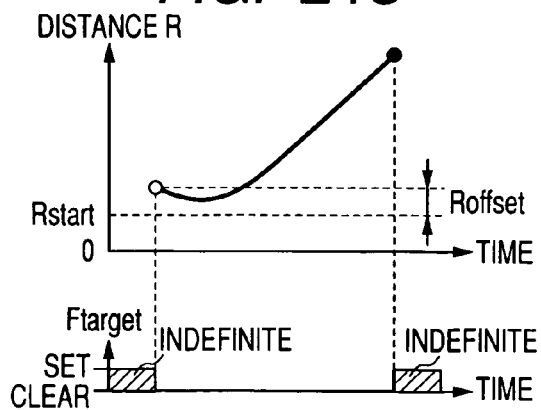
Figure 24D:
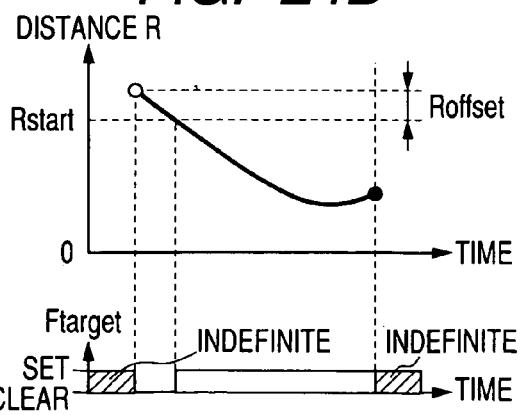

Besides, in the embodiment 2, as shown in FIGS. 24A and 24B, a distance measuring sensor 1201 is mounted at the corner of a vehicle, and is mounted so that the maximum radiation direction (direction in which the antenna gain becomes maximum) of the distance measuring sensor 1201 is directed to an oblique rear portion inclined by 45 degrees with respect to the own vehicle. The viewing angle of the distance measuring sensor 1201 used in the description of the embodiment is 90 degrees or higher, and is made 120 degrees here. In this case, as shown in FIG. 24A, in the state where an own vehicle 2401 and an oncoming vehicle 2402 cross each other, the shape of a temporal change of a distance R becomes as shown in FIG. 24C. On the other hand, as shown in FIG. 24B, in a state where a rear approaching material body 2404 overtakes the own vehicle 2403, the shape thereof becomes as shown in FIG. 24D. By following the temporal change of the distance R, the material body approaching from in front of the own vehicle can be recognized. However, as compared with the embodiment 1 (case where the viewing angle of the distance measuring sensor 1201 is less than 90 degrees), in this embodiment, as shown in FIG. 24A, even in the state where the own vehicle 2401 and the vehicle 2402 pass each other, the temporal change of the distance R to the material body indicates such a change that the distance becomes slightly smaller than the first detected distance and becomes gradually large.

Figure 25:
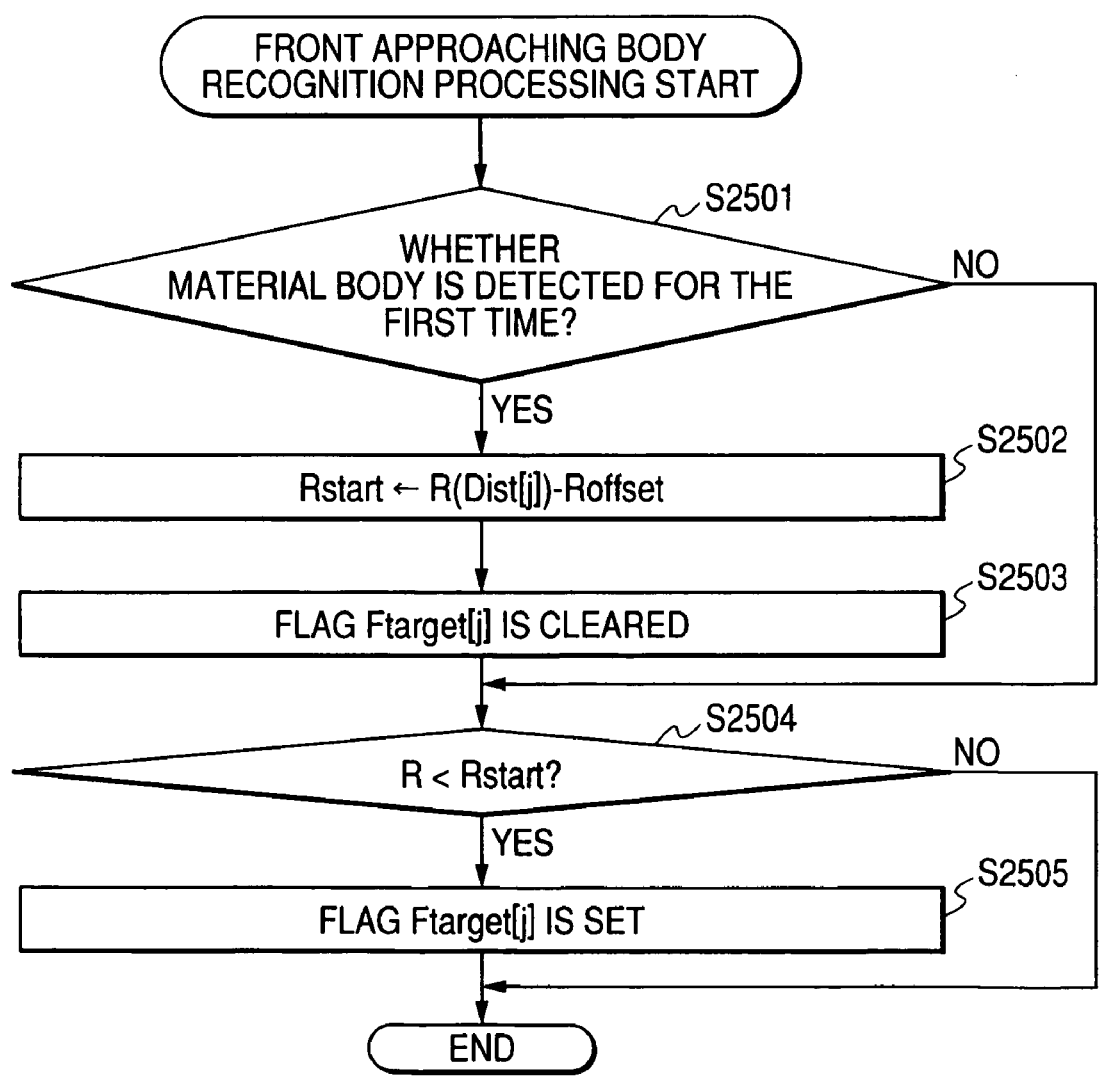
FIG. 25 is a flowchart of a front approaching body recognition processing of the embodiment 2.

FIG. 25 shows a flowchart of a front approaching body recognition processing S1504.

S2501: It is judged whether or not a material body is detected for the first time. When the material body is detected for the first time, the procedure proceeds to S2502, and if not, the procedure proceeds to S2504.

S2502: A front approaching body judgment distance Rstart is set to a value obtained by subtracting an offset distance (Roffset) from a distance R detected by the distance measuring sensor 1201 lately.

S2503: A target flag is cleared (initialization).

S2504: The front approaching body judgment distance Rstart is compared with the distance R detected by the distance measuring sensor 1201. In the case of R<Rstart, the procedure proceeds to S2505, and in the other case, the processing is ended.

S2505: It is judged that the material body approaches from behind, and the target flag is set.

That is, at the front approaching body recognition processing 1504, the distance shorter by the specified distance than the distance at the time when the material body is detected for the first time is made the reference distance. In the case where there is a history including a detected distance shorter than the reference distance, this material body is recognized to be the material body approaching from behind, and in the other case, the material body is recognized to be the material body approaching from front.

From the above, according to the embodiment 2, the stationary body such as the roadside guard rail or the wall is distinguished from the vehicle approaching from behind or the vehicle existing in the blind spot region, and a warning can be issued only in the latter case. Accordingly, there is obtained an effect that a warning unnecessary for the driver is removed and only a necessary warning can be generated. Further, also in the state where the own vehicle overtakes the large reflecting body such as a large truck, there is an effect that the body is not erroneously recognized to be the roadside stationary body such as the guard rail, and further, the viewing angle of the distance measuring sensor 1201 is expanded to 90 degrees or more, that is, while the monitor region to the rear and side is expanded, the above effect can be obtained.

Figure 26:
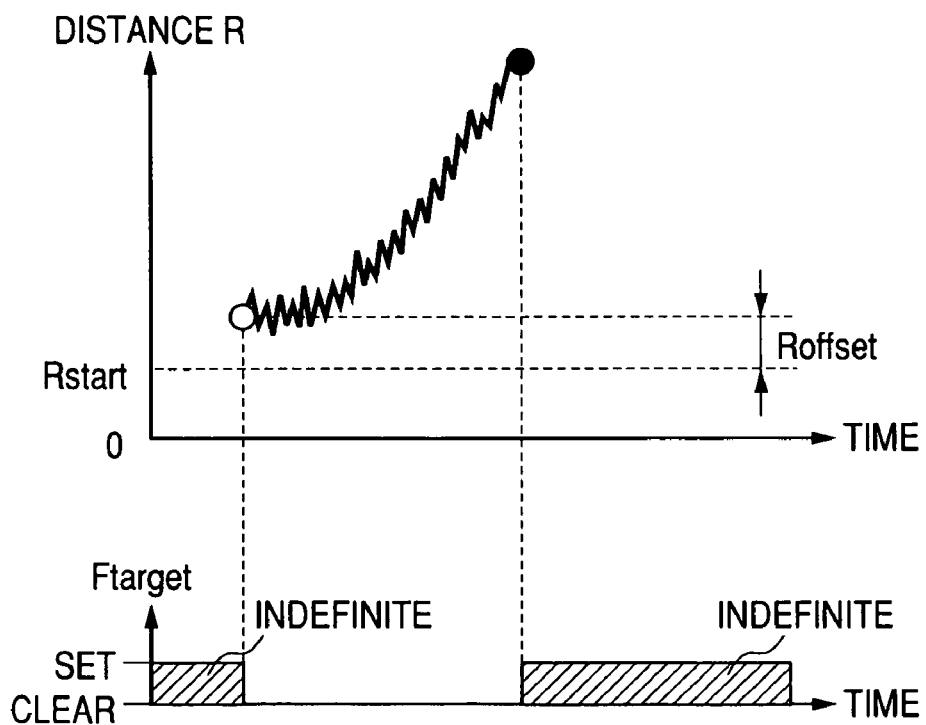
FIG. 26 is a time chart showing a distance change of a distance measuring sensor of the embodiment 2.

Besides, as in the embodiment 1, even if the viewing angle of the distance measuring sensor 1201 is less than 90 degrees, in the case where noise is included in the distance R, specifically, even in the case where only the output as shown in FIG. 26 can be obtained as the temporal change of the distance R in the state where the own vehicle and the front approaching body pass each other, the front approaching material body can be recognized by performing the warning object judgment processing of this embodiment.

Embodiment 3

Embodiment 3 of this invention will be described.

A structure of a rear and side warning apparatus in this embodiment is the same as FIG. 1. Besides, the flow of processing also follows FIG. 4, however, a method of the warning object judgment processing of S505 is different.

The warning object judgment processing of S505 of the embodiment 3 will be described in detail. Hereinafter, only different points from the embodiment 1 will be described.

Figure 27A:
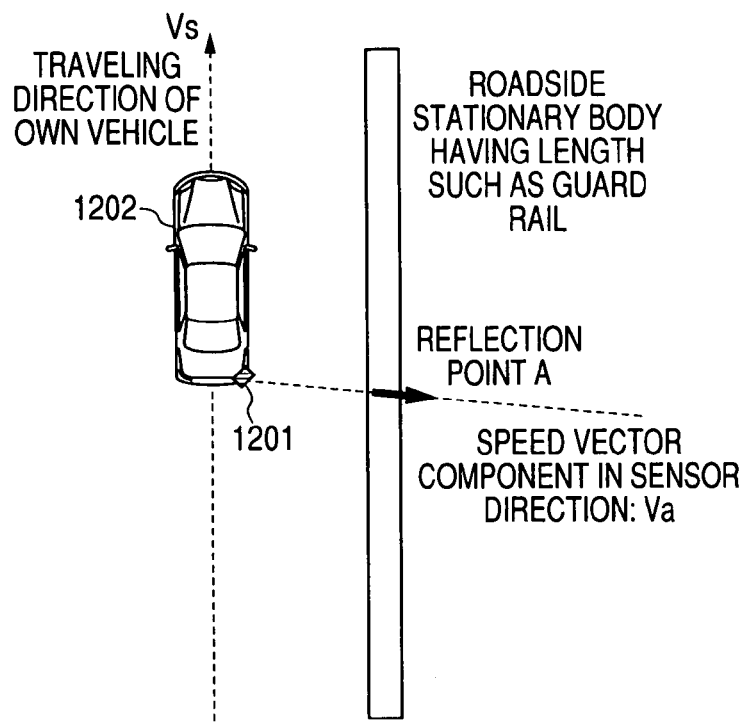
FIGS. 27A and 27B are views for explaining the peripheral state of an own vehicle of embodiment 3.
Figure 27B:
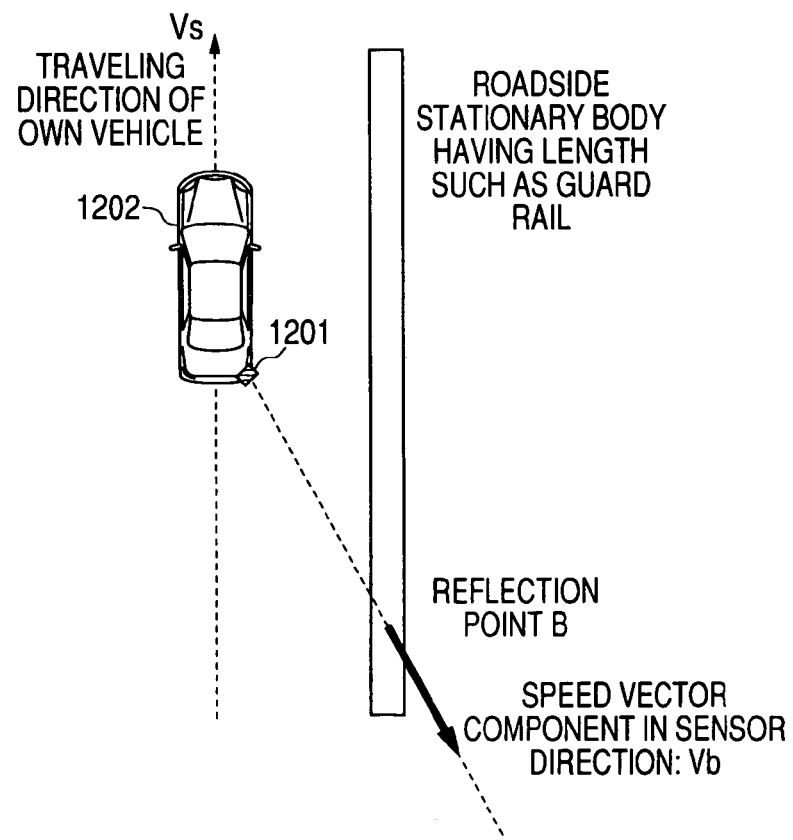

Although FIG. 13 shows the state of the detection in the case where the own vehicle travels along the roadside stationary body having a length such as the guard rail, there are various kinds of roadside stationary bodies. According to the kind, continuous reflection does not occur in a range from a relatively short distance to a longer distance as shown in FIG. 13, and the reflection occurs from a single part as shown in FIGS. 27A and 27B. In the case of FIG. 27B, since the reflection occurs from a relatively remote part, the speed vector component in the sensor direction becomes large. On the other hand, in the case of the reflection from almost just beside the sensor as shown in FIG. 27A, the speed vector in the sensor direction becomes very small. However, in the case of the roadside stationary body as stated above, since the own vehicle is actually traveling, the relative position from the sensor does not keep the same state, and the reflection point changes each time the sensor measures.

Accordingly, when it is monitored for a specified time by a frequency judgment unit whether or not a frequency component not lower than a threshold exists, it becomes possible to judge the roadside stationary body.

Figure 28:
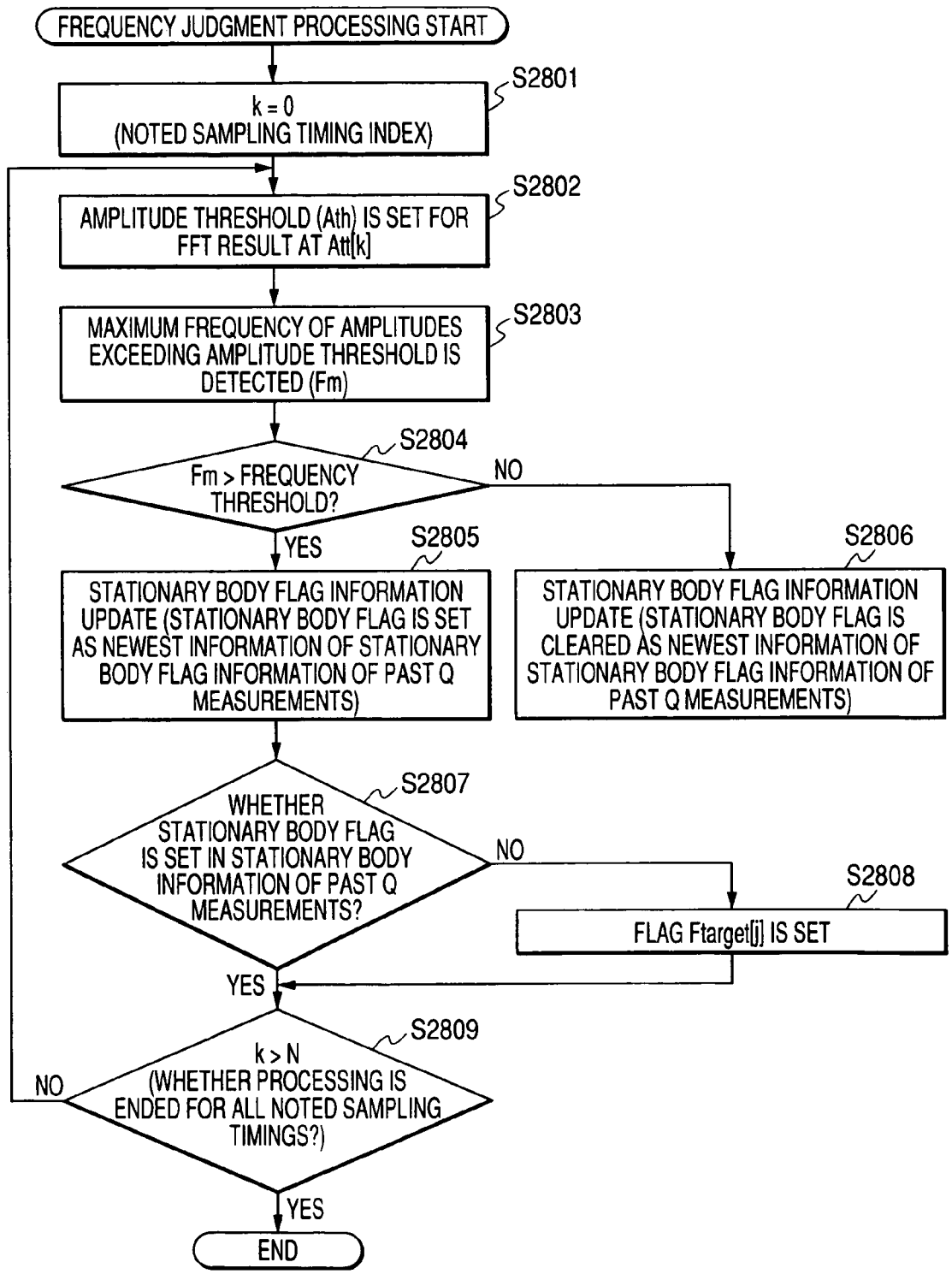
FIG. 28 is a flowchart of a frequency judgment processing of the embodiment 3.

FIG. 28 shows a flowchart of a frequency judgment processing S1507.

S2801: An index of a noted sampling timing is cleared (k=0).

S2802: A specified amplitude threshold is set for an FFT operation result at the noted sampling timing (Att[k]).

S2803: A maximum frequency (Fm) of amplitudes exceeding the amplitude threshold is detected.

S2804: The maximum frequency Fm is compared with the frequency threshold, and in the case where Fm is larger, the procedure proceeds to S2805, and in the other case, the procedure proceeds to S2806.

S2805: A stationary body flag is set as newest information of stationary body flag information for past Q measurements.

S2806: A stationary body flag is cleared as newest information of stationary body flag information for past Q measurements.

S2807: It is checked whether or not there is a history that the stationary body flag has been set in the stationary body flag information for the past Q measurements, and in the case where there is the history that the stationary body flag has been set, the procedure proceeds to S2809, and in the other case, the procedure proceeds to S2808.

S2808: It is judged that the body is not a stationary body, and a target flag (Ftarget[j]) is set.

S2809: It is checked whether or not the processing is ended on all the noted sampling timings. In the case where it is not ended, the procedure returns to S2802.

From the above, according to the embodiment 3, irrespective of the kind of the roadside stationary body having a length, the body can be judged to be the stationary body, and therefore, there is obtained an effect that a warning unnecessary for the driver can be reduced further, and a warning can be certainly issued against a vehicle approaching from behind or a vehicle existing in a blind spot region.

What is claimed is:

1. A vehicular rear and side warning device comprising:
a transmission unit for transmitting a pulse-like electric wave to an oblique rear portion at a lane change side of an own vehicle;
a reception unit for receiving a reflected wave of the electric wave transmitted from the transmission unit and reflected by plural material bodies and for outputting a beat signal;
a sampling unit for sampling the beat signal at specified time intervals from a time of transmission start;
a Fast Fourier Transform(FFT) operation unit for performing an FFT operation on sampling time series data at each of sampling timings obtained by the sampling unit;
a maximum amplitude component extraction unit for obtaining a maximum amplitude value and its frequency component on an FFT operation result at each of the sampling timings;
a detection threshold setting unit for setting a detection threshold on the basis of the maximum amplitude value at each of the sampling timings obtained by the maximum amplitude component extraction unit;
a peak detection unit for detecting a peak exceeding the detection threshold on the basis of the maximum amplitude value at each of the sampling timings obtained by the maximum amplitude component extraction unit;
a distance/relative speed operation unit for calculating a distance from a peak timing obtained by the peak detection unit and for calculating a relative speed from a frequency component at the peak timing;
a lane change intention detection unit for detecting a lane change intention of a driver;
a warning object judgment unit for judging whether a material body detected by the peak detection unit is a warning object for the driver; and
a warning judgment unit for issuing a warning to the driver when at least it is detected that a material body exists within a specified distance in a side and oblique rear portion of the own vehicle, the lane change intention of the driver is detected by the lane change intention detection unit, and the warning object judgment unit judges that the material body is the warning object for the driver, wherein the warning object judgment unit includes:

a front approaching body recognition unit for recognizing, from a temporal history of distance, a material body approaching from in front of the own vehicle;

a frequency threshold setting unit for setting a threshold on a Doppler frequency according to a speed of the own vehicle;

a noted sampling timing setting unit for setting a noted sampling timing on the basis of the peak timing obtained by the peak detection unit; and a frequency judgment unit for judging, with respect to an FFT operation result at the noted sampling timing, whether there is a frequency component not lower than the frequency threshold set by the frequency threshold setting unit, and wherein in a case where the front approaching body recognition unit judges that the material body approaches from in front of the own vehicle, and when the frequency judgment unit judges that the frequency component not lower than the frequency threshold exists, the material body is judged to be a stationary body and not to be a warning object.

2. A vehicular rear and side warning device according to claim 1, wherein the noted sampling timing setting unit sets, as the noted sampling timing, the peak timing obtained by the peak detection unit and plural adjacent sampling timings at a farther side of the timing.

3. A vehicular rear and side warning device according to claim 1, wherein the noted sampling timing setting unit sets, as the noted sampling timing, plural adjacent sampling timings at a farther side of the peak timing obtained by the peak detection unit.

4. A vehicular rear and side warning device according to claim 1, wherein the noted sampling timing setting unit sets, as the noted sampling timing, the peak timing obtained by the peak detection unit.

5. A vehicular rear and side warning device according to claim 1, wherein the frequency judgment unit sets a specified amplitude threshold for the FFT operation result at the noted sampling timing, and compares a maximum frequency value of amplitudes exceeding the threshold with the frequency threshold set by the frequency threshold setting unit.

6. A vehicular rear and side warning device according to claim 1, wherein the frequency judgment unit calculates an average amplitude value in a specified frequency range for the FFT operation result at the noted sampling timing, sets an amplitude threshold on the basis of the value, and compares a maximum frequency value of amplitudes exceeding the threshold with the frequency threshold set by the frequency threshold setting unit.

7. A vehicular rear and side warning device according to claim 1, wherein the front approaching body recognition unit sets, as a reference distance, a distance at a time when the material body is detected for the first time, and recognizes that the material body is the material body approaching from behind in a case where there is a history in which detection occurs at a distance shorter than the reference distance, and recognizes, in the other case, that the material body is the material body approaching from front.

8. A vehicular rear and side warning device according to claim 1, wherein the front approaching body recognition unit sets, as a reference distance, a distance shorter by a specified distance than a distance at a time when the material body is detected for the first time, recognizes that the material body is the material body approaching from behind in a case where there is a history in which detection occurs at a distance shorter than the reference distance, and recognizes, in the other case, that the material body is the material body approaching from front.

9. A vehicular rear and side warning device according to claim 1, wherein in a case where the front approaching body recognition unit judges that the material body approaches from front, the warning object judgment unit monitors whether a frequency component not lower than the frequency threshold exists by the frequency judgment unit for a specified time, and judges, when the frequency component not lower than the frequency threshold exists in the time, that the material body is a stationary body and is not a warning object.

* * * * *